United States Patent
Arbore et al.

(10) Patent No.: US 11,852,318 B2
(45) Date of Patent: Dec. 26, 2023

(54) OPTICAL SYSTEM FOR NOISE MITIGATION

(71) Applicant: Apple Inc., Cupertino, CA (US)

(72) Inventors: Mark Alan Arbore, Los Altos, CA (US); Matthew A. Terrel, Campbell, CA (US)

(73) Assignee: Apple Inc., Cupertino, CA (US)

( * ) Notice: Subject to any disclaimer, the term of this patent is extended or adjusted under 35 U.S.C. 154(b) by 58 days.

(21) Appl. No.: 17/470,916

(22) Filed: Sep. 9, 2021

(65) Prior Publication Data

US 2022/0074573 A1     Mar. 10, 2022

Related U.S. Application Data

(60) Provisional application No. 63/076,249, filed on Sep. 9, 2020.

(51) Int. Cl.
*G02B 27/48*     (2006.01)
*G02B 5/02*      (2006.01)
(Continued)

(52) U.S. Cl.
CPC .............. *F21V 14/00* (2013.01); *F21V 3/00* (2013.01); *F21V 5/007* (2013.01); *F21V 5/043* (2013.01);
(Continued)

(58) Field of Classification Search
CPC . G02B 27/48; G02B 5/00; G02B 5/02; G02B 19/0057; G01N 21/01
See application file for complete search history.

(56) References Cited

U.S. PATENT DOCUMENTS 3,805,074 A   4/1974  McCormack
3,861,788 A   1/1975  Webster
(Continued)

FOREIGN PATENT DOCUMENTS

CN    101199413    6/2008
CN    101622566    1/2010
(Continued)

OTHER PUBLICATIONS

Aguirre et al. (Feb. 17, 2010). "High speed optical coherence microscopy with autofocus adjustment and a miniaturized endoscopic imaging probe," Optical Society of America, vol. 18, No. 5, Retrieved from the Internet: lir-11:1-1Up://w,A,w.ncbi.nlimnih. govipmclarticies/PMC2908909/pdlioe-18-5-4222.pcii , retrieved on Oct. 31, 2014, Figures 107, pp. 4226-4235.
(Continued)

*Primary Examiner* — Ryan D Howard
(74) *Attorney, Agent, or Firm* — Brownstein Hyatt Farber Schreck, LLP

(57) ABSTRACT

Configurations for a photonics assembly design and methods for mitigating coherent noise thereof are disclosed. The photonics assembly may include a set of light sources, an optical subsystem that may include a set of optical elements, and a diffusing element. The light emitted by the set of light sources may be different wavelengths and the light may be de-cohered by a phase shifter before being received by the set of optical elements. The diffusing element may be moveable and may be capable of repeating the same positions or set of positions for each beam of light emitted by the set of light sources. By combining the coherent noise mitigation techniques of the moveable diffusing element and the de-cohered light, the photonics system may provide an illumination profile with a specific spatial profile and angular profile on the sample that allows reliable measurement of the sample and coherent noise mitigation.

16 Claims, 14 Drawing Sheets

(51) Int. Cl.
    *G01N 21/01*      (2006.01)
    *F21V 14/00*      (2018.01)
    *F21V 3/00*       (2015.01)
    *F21V 5/00*       (2018.01)
    *F21V 5/04*       (2006.01)
    *G02B 27/30*      (2006.01)
    *G02B 19/00*      (2006.01)

(52) U.S. Cl.
    CPC ......... *G02B 19/0057* (2013.01); *G02B 27/30* (2013.01); *G02B 27/48* (2013.01); *G01N 21/01* (2013.01)

(56) References Cited

U.S. PATENT DOCUMENTS

| | | |
|---|---|---|
| 4,082,464 A | 4/1978 | Johnson, Jr. |
| 4,195,311 A | 3/1980 | Moran |
| 4,236,076 A | 11/1980 | Judge |
| 4,260,263 A | 4/1981 | Kummer |
| 4,286,327 A | 8/1981 | Rosenthal |
| 4,300,167 A | 11/1981 | Miller |
| 4,810,077 A | 3/1989 | Sting |
| 4,956,796 A | 9/1990 | Rogers |
| 4,975,581 A | 12/1990 | Robinson |
| 5,220,403 A | 6/1993 | Batchelder |
| 5,287,376 A | 2/1994 | Paoli |
| 5,430,787 A | 7/1995 | Norton |
| 5,475,235 A | 12/1995 | Phillips |
| 5,483,261 A | 1/1996 | Yasutake |
| 5,488,204 A | 1/1996 | Mead et al. |
| 5,488,678 A | 1/1996 | Taneya |
| 5,644,667 A | 7/1997 | Tabuchi |
| 5,652,654 A | 7/1997 | Asimopoulos |
| 5,708,674 A | 1/1998 | Berrnink |
| 5,737,078 A | 4/1998 | Takarada |
| 5,742,631 A | 4/1998 | Paoli |
| 5,818,629 A | 10/1998 | Kinoshita |
| 5,825,352 A | 10/1998 | Bisset et al. |
| 5,835,079 A | 11/1998 | Shieh |
| 5,850,411 A | 12/1998 | Major, Jr. |
| 5,880,411 A | 3/1999 | Gillespie et al. |
| 5,915,165 A | 6/1999 | Sun |
| 5,936,739 A | 8/1999 | Cameron |
| 5,953,133 A | 9/1999 | Fujimiya et al. |
| 6,048,755 A | 4/2000 | Jiang |
| 6,104,946 A | 8/2000 | Tsuchiya |
| 6,122,042 A | 9/2000 | Wunderman et al. |
| 6,188,391 B1 | 2/2001 | Seely et al. |
| 6,198,531 B1 | 3/2001 | Nielsen |
| 6,236,459 B1 | 5/2001 | Negahdaripour |
| 6,248,988 B1 | 6/2001 | Krantz |
| 6,310,610 B1 | 10/2001 | Beaton et al. |
| 6,323,846 B1 | 11/2001 | Westerman et al. |
| 6,330,378 B1 | 12/2001 | Forrest |
| 6,393,185 B1 | 5/2002 | Deacon |
| 6,424,416 B1 | 7/2002 | Gross et al. |
| 6,519,033 B1 | 2/2003 | Quist |
| 6,594,409 B2 | 7/2003 | Dutt et al. |
| 6,628,686 B1 | 9/2003 | Sargent |
| 6,657,723 B2 | 12/2003 | Cohen |
| 6,690,387 B2 | 2/2004 | Zimmerman et al. |
| 6,795,622 B2 | 9/2004 | Forrest |
| 6,803,604 B2 | 10/2004 | Takahashi et al. |
| 6,826,424 B1 | 11/2004 | Zeng et al. |
| 6,844,554 B2 | 1/2005 | Karlsson |
| 6,892,449 B1 | 5/2005 | Brophy et al. |
| 6,940,182 B2 | 9/2005 | Hilton et al. |
| 6,940,625 B2 | 9/2005 | Endo et al. |
| 6,947,639 B2 | 9/2005 | Singh |
| 6,952,504 B2 | 10/2005 | Bi |
| 6,987,906 B2 | 1/2006 | Nakama et al. |
| 6,999,183 B2 | 2/2006 | Nielsen et al. |
| 7,015,894 B2 | 3/2006 | Morohoshi |
| 7,054,517 B2 | 5/2006 | Mossberg |
| 7,058,245 B2 | 6/2006 | Farahi |
| 7,061,623 B2 | 6/2006 | Davidson |
| 7,079,715 B2 | 7/2006 | Kish |
| 7,129,508 B2 | 10/2006 | Chen |
| 7,184,064 B2 | 2/2007 | Zimmerman et al. |
| 7,189,011 B2 | 3/2007 | Harker |
| 7,203,401 B2 | 4/2007 | Mossberg |
| 7,203,426 B2 | 4/2007 | Wu et al. |
| 7,209,611 B2 | 4/2007 | Joyner |
| 7,245,379 B2 | 7/2007 | Schwabe |
| 7,282,723 B2 | 10/2007 | Schomacker |
| 7,283,694 B2 | 10/2007 | Welch |
| 7,314,451 B2 | 1/2008 | Halperin et al. |
| 7,324,195 B2 | 1/2008 | Packirisamy et al. |
| 7,366,364 B2 | 4/2008 | Singh |
| 7,405,825 B2 | 7/2008 | Schuurmans et al. |
| 7,428,057 B2 | 9/2008 | De Lega et al. |
| 7,433,042 B1 | 10/2008 | Cavanaugh |
| 7,447,393 B2 | 11/2008 | Yan |
| 7,460,742 B2 | 12/2008 | Joyner |
| 7,466,636 B2 | 12/2008 | Buchler et al. |
| 7,477,384 B2 | 1/2009 | Schwabe |
| 7,483,599 B2 | 1/2009 | Dominic et al. |
| 7,495,768 B2 | 2/2009 | Mori et al. |
| 7,526,007 B2 | 4/2009 | Chua et al. |
| 7,558,301 B2 | 7/2009 | Lin et al. |
| 7,623,233 B2 | 11/2009 | Freese et al. |
| 7,650,743 B2 | 1/2010 | Wehler et al. |
| 7,663,607 B2 | 2/2010 | Hotelling et al. |
| 7,680,364 B2 | 3/2010 | Nilsson |
| 7,720,291 B2 | 5/2010 | Trifonov et al. |
| 7,720,328 B2 | 5/2010 | Yan |
| 7,884,933 B1 | 2/2011 | Kashyap |
| 7,885,302 B2 | 2/2011 | Eberhard |
| 7,885,492 B2 | 2/2011 | Welch |
| 7,974,504 B2 | 7/2011 | Nagarajan |
| 8,102,530 B2 | 1/2012 | Sperling |
| 8,179,526 B2 | 5/2012 | Bennett et al. |
| 8,222,084 B2 | 7/2012 | Dallesasse et al. |
| 8,300,994 B2 | 10/2012 | Welch et al. |
| 8,479,122 B2 | 7/2013 | Hotelling et al. |
| 8,498,681 B2 | 7/2013 | Wang et al. |
| 8,518,643 B2 | 8/2013 | Rank et al. |
| 8,559,775 B2 | 10/2013 | Babie et al. |
| 8,564,784 B2 | 10/2013 | Wang et al. |
| 8,597,190 B2 | 12/2013 | Rule et al. |
| 8,619,177 B2 | 12/2013 | Perwass |
| 8,619,237 B2 | 12/2013 | Hillman et al. |
| 8,629,930 B2 | 1/2014 | Brueckner et al. |
| 8,634,072 B2 | 1/2014 | Trainer |
| 8,670,123 B2 | 3/2014 | Schleipen et al. |
| 8,724,100 B1 | 5/2014 | Asghari et al. |
| 8,731,638 B2 | 5/2014 | Butler |
| 8,920,332 B2 | 12/2014 | Hong et al. |
| 8,928,877 B2 | 1/2015 | Lim et al. |
| 8,951,472 B2 | 2/2015 | Kellner et al. |
| 8,958,056 B2 | 2/2015 | Wiethege et al. |
| 8,983,250 B2 | 3/2015 | Black et al. |
| 9,013,684 B2 | 4/2015 | Xalter et al. |
| 9,020,004 B2 | 4/2015 | Jeong |
| 9,024,252 B2 | 5/2015 | Chiarello et al. |
| 9,031,412 B2 | 5/2015 | Nagarajan |
| 9,036,145 B2 | 5/2015 | Froigneux et al. |
| 9,062,957 B2 | 6/2015 | Yamada |
| 9,075,015 B2 | 7/2015 | Shapiro |
| 9,110,259 B1 | 8/2015 | Black |
| 9,135,397 B2 | 9/2015 | Denyer et al. |
| 9,176,282 B2 | 11/2015 | Pottier |
| 9,185,272 B2 | 11/2015 | Ebe |
| 9,217,669 B2 | 12/2015 | Wu et al. |
| 9,234,747 B2 | 1/2016 | Ishii et al. |
| 9,287,314 B2 | 3/2016 | Toda |
| 9,307,127 B2 | 4/2016 | Masuda |
| 9,322,773 B2 | 4/2016 | Coates et al. |
| 9,348,154 B2 | 5/2016 | Hayakawa |
| 9,370,689 B2 | 6/2016 | Guillama et al. |
| 9,377,396 B2 | 6/2016 | Goldring et al. |
| 9,380,968 B2 | 7/2016 | Nishida et al. |
| 9,405,066 B2 | 8/2016 | Mahgerefteh |

(56) References Cited

U.S. PATENT DOCUMENTS

| | | |
|---|---|---|
| 9,442,084 B2 | 9/2016 | Kakefuda |
| 9,459,201 B2 | 10/2016 | Gulati et al. |
| 9,494,535 B2 | 11/2016 | Sezginer |
| 9,531,963 B2 | 12/2016 | Yamanaka |
| 9,543,736 B1 | 1/2017 | Barwicz et al. |
| 9,562,848 B2 | 2/2017 | Goldring et al. |
| 9,585,604 B2 | 3/2017 | Ruchti et al. |
| 9,597,024 B2 | 3/2017 | Robinson et al. |
| 9,620,931 B2 | 4/2017 | Tanaka |
| 9,643,181 B1 | 5/2017 | Chang |
| 9,739,663 B2 | 8/2017 | Haider et al. |
| 9,766,370 B2 | 9/2017 | Aloe et al. |
| 9,804,027 B2 | 10/2017 | Fish et al. |
| 9,829,631 B2 | 11/2017 | Lambert |
| 9,880,352 B2 | 1/2018 | Florjanczyk |
| 9,882,073 B2 | 1/2018 | Krasulick et al. |
| 9,943,237 B2 | 4/2018 | Baker et al. |
| 9,948,063 B2 | 4/2018 | Caneau et al. |
| 9,955,111 B2 | 4/2018 | Mori |
| 10,009,668 B2 | 6/2018 | Liboiron-Ladouceur |
| 10,085,656 B2 | 10/2018 | Sato |
| 10,132,996 B2 | 11/2018 | Lambert |
| 10,139,278 B2 | 11/2018 | Fish et al. |
| 10,238,351 B2 | 3/2019 | Halperin et al. |
| 10,274,426 B2 | 4/2019 | Arbore et al. |
| 10,285,898 B2 | 5/2019 | Douglas et al. |
| 10,310,196 B2 | 6/2019 | Hutchison |
| 10,411,433 B2 | 9/2019 | Weber |
| 10,416,434 B2 | 9/2019 | Fujimoto et al. |
| 10,429,597 B2 | 10/2019 | ten Have et al. |
| 10,529,003 B2 | 1/2020 | Mazed |
| 10,551,605 B2 | 2/2020 | Arbore et al. |
| 10,620,105 B2 | 4/2020 | Trainer |
| 10,687,718 B2 | 6/2020 | Allec et al. |
| 10,718,931 B2 | 7/2020 | Arbore et al. |
| 10,788,366 B2 | 9/2020 | Arbore et al. |
| 10,801,950 B2 | 10/2020 | Kangas et al. |
| 10,852,492 B1 | 12/2020 | Vermeulen et al. |
| 11,035,793 B2 | 6/2021 | Arbore et al. |
| 11,064,592 B1 | 7/2021 | Bismuto et al. |
| 11,206,985 B2 | 12/2021 | Alford et al. |
| 11,226,459 B2 | 1/2022 | Bishop et al. |
| 11,243,115 B2 | 2/2022 | Arbore et al. |
| 11,275,405 B2 | 3/2022 | Hotelling |
| 11,378,808 B2 | 7/2022 | Hargis et al. |
| 2003/0108821 A1 | 6/2003 | Mei |
| 2004/0126117 A1 | 7/2004 | Lo et al. |
| 2005/0053112 A1 | 3/2005 | Shams-Zadeh-Amiri |
| 2005/0063431 A1 | 3/2005 | Gallup et al. |
| 2006/0002443 A1 | 1/2006 | Farber et al. |
| 2006/0178570 A1 | 8/2006 | Robinson |
| 2007/0057211 A1 | 3/2007 | Bahlman et al. |
| 2007/0258083 A1 | 11/2007 | Heppell |
| 2008/0044128 A1 | 2/2008 | Kish et al. |
| 2008/0310470 A1 | 12/2008 | Ooi et al. |
| 2009/0087925 A1 | 4/2009 | Wagner |
| 2010/0220315 A1 | 9/2010 | Morrell et al. |
| 2011/0081064 A1 | 4/2011 | Hsu |
| 2011/0184260 A1 | 7/2011 | Robinson et al. |
| 2012/0059232 A1 | 3/2012 | Gross et al. |
| 2012/0281258 A1 | 11/2012 | Sheblee et al. |
| 2014/0029943 A1 | 1/2014 | Mathai et al. |
| 2015/0018642 A1 | 1/2015 | Gulati et al. |
| 2016/0224750 A1 | 8/2016 | Kethman et al. |
| 2017/0164878 A1 | 6/2017 | Connor |
| 2018/0241174 A1 | 8/2018 | Weber |
| 2019/0339468 A1 | 11/2019 | Evans et al. |
| 2019/0342009 A1 | 11/2019 | Evans et al. |
| 2020/0026090 A1* | 1/2020 | Hargis .................. G02B 21/16 |
| 2020/0152615 A1 | 5/2020 | Krasulick et al. |
| 2020/0244045 A1 | 7/2020 | Bismuto et al. |
| 2020/0253547 A1 | 8/2020 | Harris et al. |
| 2020/0309593 A1 | 10/2020 | Bismuto et al. |
| 2021/0018432 A1 | 1/2021 | Kangas et al. |
| 2021/0033805 A1 | 2/2021 | Bishop et al. |
| 2021/0199576 A1 | 7/2021 | Arbore et al. |
| 2021/0263216 A1 | 8/2021 | Bishop et al. |
| 2021/0302313 A1 | 9/2021 | Arbore et al. |
| 2022/0037856 A1 | 2/2022 | Ghosh et al. |
| 2022/0104735 A1 | 4/2022 | Lee et al. |
| 2022/0136899 A1 | 5/2022 | Arbore et al. |
| 2022/0236503 A1 | 7/2022 | Bishop et al. |
| 2023/0204497 A1 | 6/2023 | Kangas et al. |

FOREIGN PATENT DOCUMENTS

| | | |
|---|---|---|
| CN | 101625319 | 1/2010 |
| CN | 102038486 | 5/2011 |
| CN | 102334021 | 1/2012 |
| CN | 102439426 | 5/2012 |
| CN | 102472664 | 5/2012 |
| CN | 102519976 | 6/2012 |
| CN | 102803930 | 11/2012 |
| CN | 103842797 | 6/2014 |
| CN | 104614084 | 5/2015 |
| CN | 104733483 | 6/2015 |
| CN | 105223163 | 1/2016 |
| CN | 105438912 | 3/2016 |
| CN | 108449957 | 8/2018 |
| DE | 102018211972 | 1/2020 |
| EP | 0168983 | 1/1986 |
| EP | 0943270 | 9/1999 |
| EP | 1292134 | 3/2003 |
| EP | 1403985 | 3/2004 |
| EP | 1432045 | 6/2004 |
| EP | 2320027 | 5/2011 |
| GB | 2399220 | 9/2004 |
| JP | 2000163031 | 6/2000 |
| JP | 2000171403 | 6/2000 |
| JP | 2002342033 | 11/2002 |
| JP | 2003090798 | 3/2003 |
| JP | 2008262118 | 10/2008 |
| JP | 2010044004 | 2/2010 |
| JP | 2014163895 | 9/2014 |
| JP | 2020511693 | 4/2020 |
| JP | 2020516959 | 6/2020 |
| KR | 20070092818 | 9/2007 |
| KR | 1020090116731 | 11/2009 |
| KR | 1020110077598 | 7/2011 |
| KR | 20130045189 | 5/2013 |
| KR | 1020140130702 | 11/2014 |
| WO | WO 85/003575 | 8/1985 |
| WO | WO 01/014929 | 3/2001 |
| WO | WO 03/056876 | 7/2003 |
| WO | WO 03/087787 | 10/2003 |
| WO | WO 04/031824 | 4/2004 |
| WO | WO 05/091036 | 9/2005 |
| WO | WO 06/086566 | 8/2006 |
| WO | WO 07/121593 | 11/2007 |
| WO | WO 08/032913 | 3/2008 |
| WO | WO 11/090274 | 7/2011 |
| WO | WO 13/126280 | 8/2013 |
| WO | WO 15/101992 | 7/2015 |
| WO | WO 16/106350 | 6/2016 |
| WO | WO 16/106368 | 6/2016 |
| WO | WO 16/109355 | 7/2016 |
| WO | WO 17/040431 | 3/2017 |
| WO | WO 17/184420 | 10/2017 |
| WO | WO 17/184423 | 10/2017 |
| WO | WO 19/152990 | 8/2019 |
| WO | WO 20/065391 | 4/2020 |
| WO | WO 20/106974 | 5/2020 |

OTHER PUBLICATIONS

Ke, S. et al. (Feb. 10, 2009) "Three-dimensional coherent transfer function for a confocal microscope with two D-shaped pupils," Applied Optics, Optical Society of America, Washington, DC; US, vol. 48, No. 5, pp. 810-817.

Kurugol, S. et al. (2011). "Semi-automated Algorithm for Localization of Dermal/Epidermal Junction in Reflectance Confocal Microscopy Images of Human Skin," Proc. of SPIE, vol. 7904, ten pages.

(56) References Cited

OTHER PUBLICATIONS

Lee, S.K. et al. (Apr. 1985). "A Multi-Touch Three Dimensional Touch-Sensitive Tablet," Proceedings of CHI: ACM Conference on Human Factors in Computing Systems, pp. 21-25.
Rubine, D.H. (Dec. 1991). "The Automatic Recognition of Gestures," CMU-CS-91-202, Submitted in Partial Fulfillment of the Requirements for the Degree of Doctor of Philosophy in Computer Science at Carnegie Mellon University, 285 pages.
Rubine, D.H. (May 1992). "Combining Gestures and Direct Manipulation," CHI '92, pp. 659-660.
U.S. Appl. No. 17/373,167, filed Jul. 12, 2021, Bismuto et al.
U.S. Appl. No. 17/379,759, filed Jul. 19, 2021, Lee et al.
U.S. Appl. No. 17/386,297, filed Jul. 27, 2021, Tu et al.
U.S. Appl. No. 17/386,362, filed Jul. 27, 2021, Tu et al.
U.S. Appl. No. 17/407,016, filed Aug. 19, 2021, Hill et al.
U.S. Appl. No. 17/408,122, filed Aug. 20, 2021, Wu.
Gonzalez-Sanchez et al., "Capacitive Sensing for Non-Invasive Breathing and Heart Monitoring in Non-Restrained, Non-Sedated Laboratory Mice," Sensors 2016, vol. 16, No. 1052, pp. 1-16.
He et al., "Integrated Polarization Compensator for WDM Waveguide Demultiplexers," IEEE Photonics Technology Letters vol. 11, No. 2, Feb. 1999, pp. 224-226.
Kybartas et al., "Capacitive Sensor for Respiratory Monitoring," Conference "Biomedical Engineering," Nov. 2015, 6 pages.
Lapedus, "Electroplating IC Packages—Tooling challenges increase as advanced packaging ramps up," *Semiconductor Engineering*, https://semiengineering.com/electroplating-ic-packages, Apr. 10, 2017, 22 pages.
Materials and Processes for Electronic Applications, Series Editor: James J. Licari, AvanTeco, Whittier, California, Elsevier Inc., 2009, 20 pages.
Worhoff et al., "Flip-chip assembly for photonic circuits," MESA+ Research Institute, University of Twente, Integrated Optical MicroSystems Group, The Netherlands, 12 pages.
International Search Report and Written Opinion dated Jan. 7, 2022, PCT/US2021/049683, 11 pages.
Bogaerts, et al., "Off-Chip Coupling," *Handbook of Silicon Photonics*, CRC Press, Apr. 2013, 43 pages.
Sayli et al., "Two-distance partial pathlength method for accurate measurement of muscle oxidative metabolism using fNIRS," Proceeding of SPIE, Bellingham, Washington USA, vol. 6084, 2006, 8 pages.
Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.
U.S. Appl. No. 18/205,551, filed Jun. 4, 2023, Arbore et al.
Xia et al., "Study of optical parameters of polystyrene spheres in dense aqueous suspensions," *Applied Optics*, May 23, 2012, vol. 51, No. 16, pp. 3263-3268.

\* cited by examiner

OPTICAL SYSTEM FOR NOISE MITIGATION

CROSS-REFERENCE TO RELATED APPLICATION

This application is a nonprovisional of, and claims the benefit under 35 U.S.C. 119(e) of, U.S. Provisional Patent Application No. 63/076,249, filed Sep. 9, 2021, the contents of which are incorporated herein by reference as if fully disclosed herein.

FIELD

This disclosure relates generally to systems and methods for coherent noise mitigation. More particularly, this disclosure relates to a system with multiple light sources and optical elements that produce de-cohered light which forms an asymmetric launch beam.

BACKGROUND

Generally, noise in various types of imaging systems may cause unwanted modifications of a signal. Noise may degrade images in systems such as medical ultrasound systems, radar systems, projection systems, or any coherent imaging system. Noise may cause graininess, granular patterns, or intensity patterns in the measured signal or image. In some examples, noise may significantly interfere with the detection of an optical signal, thus the illumination conditions may be designed to mitigate noise, while maintaining other specifications of the optical system such as operating speed and size of the optical device or system.

SUMMARY

Embodiments of the systems, devices, methods, and apparatuses described in the present disclosure are directed to an optical system for mitigating coherent noise. Also described are systems, devices, methods, and apparatuses directed to providing de-cohered light that produces an asymmetric launch beam. The optical system may include multiple light sources that provide de-cohered light via phase shifts, frequency differences, and so forth. An optical subsystem may receive the light from the light sources and may substantially collimate the light to produce a desired intensity profile of a launch beam. The launch beam may include light in the form of light beams from the light sources, where each light beam is incident onto the launch beam with different angles from one another. The optical system may also include a moveable diffuser to assist in mitigating coherent noise.

In some examples, the present disclosure describes a photonics assembly. The photonics assembly may include a set of semiconductor light sources, each of the set emitting light, a set of output couplers for receiving light from the set of semiconductor light sources, an optical subsystem positioned to receive the light from the set of output couplers and shape the light, and a diffuser configured to provide the light with a coherent noise state of a set of coherent noise states on a sample, where the diffuser is operative to repeatedly move between at least a first position and a second position and by moving repeatedly between at least the first position and the second position, the diffuser mitigates coherent noise. In some examples, the photonics assembly may include a set of phase shifters positioned to transmit light to each output coupler of the set of output couplers and generates de-cohered light, a beam spread of the light emitted by the set of semiconductor light sources upon exiting the set of semiconductor light sources is between 1 and 5 microns in at least one dimension, and a beam spread exiting the diffuser is in a range of 2-4 mm upon incidence on a sample in at least one dimension. In some examples, the beam spread exiting the diffuser may be approximately 0.5 mm by 2-4 mm.

In some examples, the optical subsystem may include a collimating array positioned to receive the light from the set of output couplers and a deflection prism array positioned to receive the light from the collimating array. In some examples, the optical subsystem may include a collimating array positioned to receive the light from the set of output couplers and a diverger array positioned to receive the light from the collimating array. In some examples, the optical subsystem may include a decentered toroidal lens array positioned to receive the light from the set of output couplers. In some examples, the optical subsystem may include a cylinder lens array positioned to receive the light from the set of output couplers, and a crossed cylinder lens array positioned to receive the light from the cylinder lens array. In some examples, the diffuser is configured to provide diffused light in an eight degree by eight degree light beam to the sample.

In some examples, the present disclosure describes an optical system. The optical system may include a set of semiconductor light sources for emitting light with multiple light beams, a set of output couplers for receiving the light from the set of semiconductor light sources, and a moveable diffusing element configured to receive the light from the set of optical couplers, move to a set of positions for each output coupler of the set of output couplers to provide a set of different coherent noise states corresponding to each output coupler of the set of output couplers, and define an illumination profile incident on a sample. In some examples, the optical system may include an optical subsystem configured to receive the light from the set of output couplers and a set of phase shifters for de-cohering the light, where each light beam of the multiple light beams received by the set of output couplers is de-cohered by a corresponding phase shifter of the set of phase shifters, and each of the set of positions is repeatable. In some examples, the optical system may include a frequency modulator for de-cohering the light provided by the set of output couplers. In some examples, the moveable diffusing element is a circular diffuser. In some examples, the illumination profile is based at least partially on the angle spacing of light received from the optical subsystem. In some examples, the illumination profile is based at least partially on the total range of angles of light incident on the diffuser. In some examples, the light emitted by each light source of the set of semiconductor light sources is a different wavelength.

In some examples, the present disclosure describes a method for mitigating coherent noise. The method may include emitting de-cohered light from a set of light sources, receiving the de-cohered light at an optical subsystem that generates a desired illumination profile, and diffusing the desired illumination profile of the de-cohered light using a moveable diffuser with coherent noise-unique diffuser states for each light beam received from each light source of the set of light sources. In some examples, the illumination profile is based at least partially on the angle spacing of light received from the optical subsystem, the coherent noise-unique diffuser states for each light beam may be repeatable, and the total range of angles of light incident on the diffuser. In some examples, emitting the de-cohered light may include generating a beam spread that is less than 4 microns upon exiting the set of light sources. In some examples, diffusing the de-cohered light may include generating a beam spread of less than 3.2 mm when incident on a sample. In some examples, emitting the de-cohered light may include phase shifting the de-cohered light. In some examples, each light source of the set of light sources is a different wavelength from each other, and diffusing the de-cohered light may include generating a set of coherent noise views, wherein a same coherent noise view is generated for each wavelength.

In addition to the example aspects and embodiments described above, further aspects and embodiments will become apparent by reference to the drawings and by study of the following description.

Figure 1:
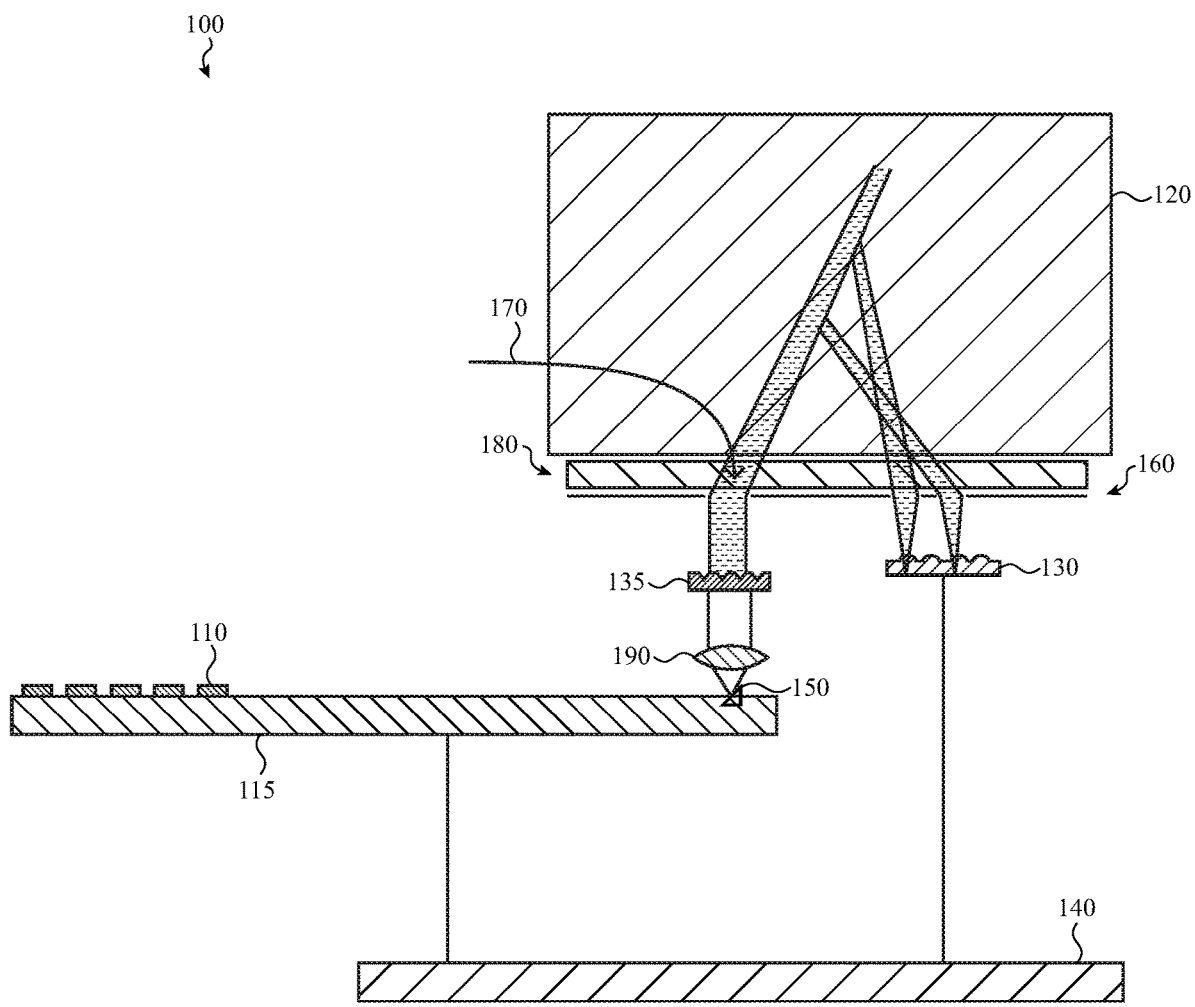
FIG. 1 illustrates an example photonics assembly.

It should be understood that the proportions and dimensions (either relative or absolute) of the various features and elements (and collections and groupings thereof) and the boundaries, separations, and positional relationships presented between them, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

Reference will now be made in detail to representative embodiments illustrated in the accompanying drawings. It should be understood that the following description is not intended to limit the embodiments to one preferred embodiment. To the contrary, it is intended to cover alternatives, modifications, and equivalents as can be included within the spirit and scope of the described embodiments as defined by the appended claims.

Generally noise, such as random or semi-random noise, may be present in various types of imaging systems and may cause unwanted modifications of a signal. In some examples, the noise in the imaging systems may be coherent noise. Noise may degrade images in systems such as medical ultrasound systems, radar systems, projection systems, or any coherent imaging system by causing graininess, granular patterns, or intensity patterns in the image. Some systems may produce signals with so much noise that it may be difficult to determine the measured signal. In some examples, coherent multipath-interference may be a noise source, one example of which may be speckle noise.

In some examples, coherent noise may significantly interfere with the detection of an optical signal, thus the illumination conditions may be designed to mitigate coherent noise, while maintaining other specifications of the optical system such as operating speed and size of the optical device or system. Different factors may be considered when mitigating or reducing coherent noise including, but not limited to, illumination conditions within the geometrical specification of the system such as intensity profile of the light, the angle distribution or beam spread angles of the light, and reducing the number of moving parts of the optical system.

In mitigating noise in optical systems, coherent noise may be reduced without exacerbating other noise sources in the optical system such as detector noise and laser noise. In some examples, coherent noise may be reduced by combining the functionality of multiple elements in the optical system such as a moving diffuser and a phase shifter in the integrated optics. Additionally, coherent noise may be mitigated by de-cohering multiple light outputs from each other via some temporally varying phase relationships. These phase relationships may be from phase shifters, frequency modulators, and/or from chirping and group delay, any combination thereof, and so forth. In some examples, coherent noise may be mitigated by each output receiving a slightly different wavelength. By using these elements in conjunction with observing other specifications of the optical system, coherent noise may be mitigated or reduced so that optical signals may be measured more effectively by the optical system.

Disclosed herein are optical systems, devices, and methods for mitigating coherent noise using a moving diffuser and de-cohered light together to produce a predetermined illumination profile incident on the sample. A photonics assembly may include photonics dies that emit multiple wavelengths. Additionally, the photonics assembly may include the photonics die(s), outcouplers, optical components that receive light from the photonics die(s), free space optics, and so forth, but does not include the sample. The photonics assembly will be described in further detail with reference to FIG. 1. The light emitted by the photonics die(s) may be de-cohered using a phase shifter which may be part of or external to the photonics die. The light may be received by an optical subsystem that shapes the light and steers the light to a diffusing element. The optical subsystem may include one or more optical components as appropriate to achieve the desired shape and beam angles incident on the diffusing element. In some examples, the optical subsystem may shape the light by collimating the light. Generally, shaping the light may include directing the light, focusing the light, collimating the light, other suitable shaping functions, and/or any combination thereof.

In some examples, the diffusing element may move in one or more dimensions to generate, in conjunction with the de-cohered light beams, unique coherent noise views or coherent noise states and the positions of the diffusing element may also be repeatable. Coherent noise may cause graininess, granular patterns, or intensity patterns in the measured signal or image. In some examples, a first light may experience coherent multipath-interference that creates coherent noise, where the first coherent noise may exhibit a first intensity pattern, which may be a first coherent noise view or coherent noise state. Further to this example, a second light may experience coherent multipath-interference that creates coherent noise, where the second coherent noise may exhibit a second intensity pattern, which may be a second coherent noise view or coherent noise state. What qualifies as unique coherent noise views or unique (e.g., different) coherent noise states is largely dependent on the accuracy constraints for a given system design and intended sample characteristics, but for the purposes of this application, two or more spectroscopic measurements of a sample have unique noise views or unique coherent noise states if they have a correlation coefficient r that is between 0 and 0.5 (e.g., between 0 and 0.5 the noise views are decorrelated from one another). It should be appreciated however, that some systems may be designed with a different accuracy constraint (e.g., r between 0 and 0.4 or r between 0 and 0.3). The correlation coefficient may be at least partially based on mapping the intensity value of the image where the bright areas may correspond to high correlation and the dark areas may correspond to low correlation.

As described herein, although the positions or the sets of positions of the diffusing element are discussed as repeatable, the positions or the sets of positions may be approximately repeatable and within about a ten percent variation of the actual position. In some examples, the diffuser may move between a predetermined set of positions repeatedly over the course of a measurement. The predetermined set of positions may be a repeating sequence (e.g., 1-2-3-4-1-2-3-4 or 1-2-3-4-4-3-2-1) or a pseudo-random sequence (e.g., 1-2-4-1-2-3-1-4 . . . ), and the diffuser may spend equal time at each position. Additionally, in performing measurements, there may be some inaccuracy between a target position of the diffuser and the actual position. The tolerances may be dependent on an individual system and may vary from system to system. In some examples, the predetermined set of positions may be selected to be far enough apart such that, even when the tolerances may be accounted for, they may provide unique coherent noise views or coherent noise states.

Each of the photonics dies may emit respective light beams that after passing through optical elements of the system may be incident on the diffusing element with a predetermined beam spread. Additionally, each of the light beams may have a different angle relative to the diffusing element due to the spacing of the photonics die and the optical elements of the system. It may be understood that light beams are a portion of light that have one or more light rays. The diffusing element may move to a repeatable set of positions for each light beam so that each light beam may pass through the same or a similar set of diffusing element positions as each of the other light beams. The diffusing element may move to a set of positions for an individual light beam so that the individual light beam will provide a corresponding set of coherent noise views or coherent noise states incident on the sample. The diffusing element may then move to the same or similar set of positions for the light beam in the next spatial position to provide a corresponding set of coherent noise views or coherent noise states for that light beam, and so forth. It may be understood that although a light beam in a first position and a next spatial position may be discussed, the diffuser may change the coherent noise view for all of the light beams simultaneously. By providing each light beam with repeatable positions, the signals measured from the different light beams may be averaged together so that the signals will approach or in some cases converge to the correct measured signal and with reduced coherent noise. In other embodiments, each diffuser position may be visited only once per overall measurement and the wavelengths may be used multiple times and once per diffuser position. Put another way, in some embodiments, the diffuser positions may be nested within the wavelengths, and in other embodiments, the wavelengths may be nested within the diffuser positions.

In some examples, each wavelength can experience the same diffuser position, but the coherent noise state for each wavelength at a given diffuser position may be different because the wavelength is different. When mitigating coherent noise, the same or a similar coherent noise view or coherent noise state may be available at every wavelength or wavelength range emitted by the photonics die. By interrogating the light at the various angles of the individual light beams, each signal may include some coherent noise. The signals of the different angles of light are averaged together, and the coherent noise may approach a zero mean insofar as the signals may approach or converge to the correct signal or the measured signal without coherent noise. The terms "coherent noise view" and "coherent noise state" may be used interchangeably herein.

Even though taken individually, the diffusing element or the phase shifters may be capable of generating unique coherent noise views at a sufficient rate for coherent noise mitigation for the photonics assembly, each component used individually and without the other may occupy too much space and require too much operating power that the combination of the diffusing element with the phase shifters may better comply with the photonics assembly specifications due to space and power considerations. Although the diffusing element and the phase shifters each may generate unique views, the combination may allow for an increased number of coherent noise views in a small form factor device and/or system.

These and other embodiments are discussed below with reference to FIGS. 1-8. However, those skilled in the art will readily appreciate that the detailed description given herein with respect to these figures is for explanatory purposes only and should not be construed as limiting.

Directional terminology, such as "top", "bottom", "upper", "lower", "above", "below", "beneath", "front", "back", "over", "under", "left", "right", and so forth, is used with reference to the orientation of some of the components in some of the figures described below. Because components in various embodiments can be positioned in a number of different orientations, directional terminology is used for purposes of illustration only and is in no way limiting. The directional terminology is intended to be construed broadly, and therefore should not be interpreted to preclude components being oriented in different ways.

As used throughout this specification, a reference number without an alpha character following the reference number can refer to one or more of the corresponding references, the group of all references, or some of the references. For example, "215" can refer to any one of the photonics dies 215 (e.g., photonics die 215A, photonics die 215B, etc.), can refer to all of the photonics dies 215, or can refer to some of the photonics dies (e.g., both photonics die 215A and photonics die 215B) depending on the context in which it is used.

Representative applications of methods and apparatuses according to the present disclosure are described in this section. These examples are being provided solely to add context and aid in the understanding of the described examples. It will thus be apparent to one skilled in the art that the described examples may be practiced without some or all of the specific details. Other applications are possible, such that the following examples should not be taken as limiting.

FIG. 1 illustrates an example photonics assembly 100 which may include an interface 180, a light emitter 110, a detector 130, and a controller 140. The interface 180 can include an external surface of a device which can accommodate light transmission therethrough. It may be understood that the interface 180 may accommodate light transmission in the working wavelengths. In some examples, the working wavelengths may be wavelengths of light used to measure properties of the sample. Further and in some examples, the interface 180 may be opaque to visible light as visible wavelengths of light may not be used to measure properties of the sample. In some examples, the photonics assembly 100 can include an aperture structure 160 including regions that provide different functionalities. In some examples, the regions of the aperture structure 160 may include one or more of a transparent region 170, an opaque region, a translucent region, a reflective region, a region having a different refractive index than surrounding material, any combination thereof and so forth. The aperture structure 160 may direct and/or control the launch position of the light into the measured sample volume 120 and the collection position of the returned light from the measured sample volume 120. By controlling the location and/or angles of light entering a measured sample volume 120, the light incident on a measured sample volume 120, and/or exiting from a measured sample volume 120 can be selectively configured. As depicted in FIG. 1, the aperture structure 160 may be a single interface with multiple apertures, however, the interface may be split into different windows such as a launch window and one or more collection windows. In some examples, the photonics assembly may include the photonics die(s), outcouplers, optical components that receive light from the photonics die(s), free space optics, and so forth, but does not include the sample. Although depicted in FIG. 1, the measured sample volume 120 is not included in the photonics assembly 100. The terms "photonics assembly" and "photonics system" may be used interchangeably herein.

While operating the photonics assembly 100, the measured sample volume 120 can be located close to, or touching at least a portion of, the photonics assembly 100, such as the photonics system interface 180. The one or more light emitters 110 can be coupled to the controller 140. The controller 140 can send a signal (e.g., current or voltage waveform) to control the light emitters 110, which can emit light. The one or more light emitters 110 may be included in one or more photonics dies 115, which will be discussed in detail herein. Discussions herein may reference the photonics die(s) 115 as emitting light, though it may be one or more light emitters 110 that are part of the photonics die 115 that may be generating light. As such, discussions of the photonics dies emitting light are understood to encompass a light emitter generating light, so long as that light emitter is part of the photonics die.

In some examples, the photonics die 115 may emit light, which may be reflected by the outcoupler or mirror 150 included in the photonics die 115, and the light may be received by a lens 190. The lens 190 may be a free space lens and, although referred to as a single lens, in some examples, the lens 190 may be multiple lenses. Additionally, the lens 190 may be a single lens that performs multiple functions or may be multiple lenses that each performs a function such as collimating light and/or beam steering or beam shaping light received from the photonics die 115. The lens 190 will be discussed in further detail herein with reference to FIGS. 2A-8. The light from the lens 190 may be directed to a diffusing element 135. The diffusing element 135 may move in one or multiple dimensions and the movement of the diffusing element 135 may be discrete or continuous. In some examples, a discrete diffusing element 135 may step between different positions, while a continuous diffusing element may vibrate or otherwise continuously move without stopping at a particular position. In still further examples, the diffusing element 135 may be capable of moving to any target position within a desired range or may be only physically capable of moving between some fixed positions. The diffusing element 135 may generate an illumination profile of light that is based at least partially on the angle spacing of light received from the lens 190 and the total range of angles of light incident on the diffuser. The diffusing element will be discussed in further detail with reference to FIGS. 2A-8.

Depending on the nature of the measured sample volume 120, light can penetrate into the measured sample volume 120 to reach one or more scattering sites and can return (e.g., reflect and/or scatter back) towards the photonics assembly 100 with a controlled path length. The return light that enters back into the photonics assembly 100 may be directed, collimated, focused, and/or magnified. The return light can be directed towards the detector 130. The detector 130 can detect the return light and can send an electrical signal indicative of the amount of detected light to the controller 140. In some examples, the detector 130 may have optical elements to direct, collimate, focus, magnify, or otherwise shape the return light from the sample.

Additionally or alternatively, the light emitter 110 can optionally emit light towards the reference (not illustrated in FIG. 1). The reference can redirect light towards optics which may include, but are not limited to, a mirror, lenses, and/or a filter, and also may redirect light towards a sample with known optical properties. The optics may direct, collimate, focus, magnify, or otherwise shape the return light towards the detector 130. The detector 130 can measure light reflected from the reference and can generate an electrical signal indicative of this reflected light for quality purposes. As illustrated in FIG. 1, the light emitter 110 emits light toward an outcoupler or mirror 150. In some examples, the detector 130 may not have unique and/or individual corresponding pixels for each of the sample and reference signals. In some examples, the optics may direct the reference light onto the same pixel(s), and the measurements may be time multiplexed. Additionally in some examples, the detector 130 may include one or more pixels, where each of the one or more pixels may output a respective signal based on the light or return light collected by that pixel. Thus, any individual signal generated by the detector 130 may be representative of a signal or of a reference, depending on which part of the system the light or return light striking that pixel is coming from.

The controller 140 can be configured to receive one or more electrical signals from the detector 130, and the controller 140 (or another processor) can determine the properties of a sample from the received electrical signals. In some instances, the detector 130 can generate signals in response to receiving and/or absorbing returned light and, in some examples, may generate at least two electrical signals, where one electrical signal can be indicative of returned light, which may be reflected and/or scattered from the measured sample volume 120, and another electrical signal can be indicative of light reflected/scattered from the reference. Additionally, the detector 130 may be configured to transmit the electrical signals to the controller 140. In some examples, each of the different electrical signals can be a time-multiplexed signal. For example, each of the different electrical signals for the measured sample volume and the reference may alternate with one another at different points in time. Further to this example, a signal during a first time period may be representative of the reference, and the signal during the second time period may be representative of the sample. In other instances, two or more electrical signals can be received by different detector pixels concurrently and each of the electrical signals may include information indicative of different light information such as wavelength and intensity.

Generally, photonics systems may be used for sensing and processing light in electronic systems and devices. Some photonics assemblies may be used for transmitting light and may be included in an electronic device, such as mobile devices, tablets, smart phones, and so forth, which may be used for various purposes such as optical communication, environmental sensing, and/or biometric sensing. Mobile electronic devices are growing in popularity and these devices are often small enough to be portable and/or handheld. The architectures of these mobile devices may include various components, including photonics circuitry, which may affect the size of the device into which it is incorporated.

Because of the increasing emphasis on smaller, more compact electronic devices, the size and thickness of the components inside of the electronic device may be limited. In some examples, a particular size of the electronic device is targeted and each component within the electronic device is given a maximum form factor or area that the component(s) may occupy within the electronic device. Accordingly, the physical configuration of the individual components, such as optical elements, light emitters, detectors, and an integrated circuit, such as a photonics integrated circuit and/or photonics assembly, may become increasingly important to the form factor of the device. In some examples, the photonics assembly 100 may be included in various handheld or portable electronic devices such as mobile devices and wearable devices such as a smart phone, tablet, watch, or any type of device that may be worn by a user such as a cuff or bracelet.

Figure 2A:
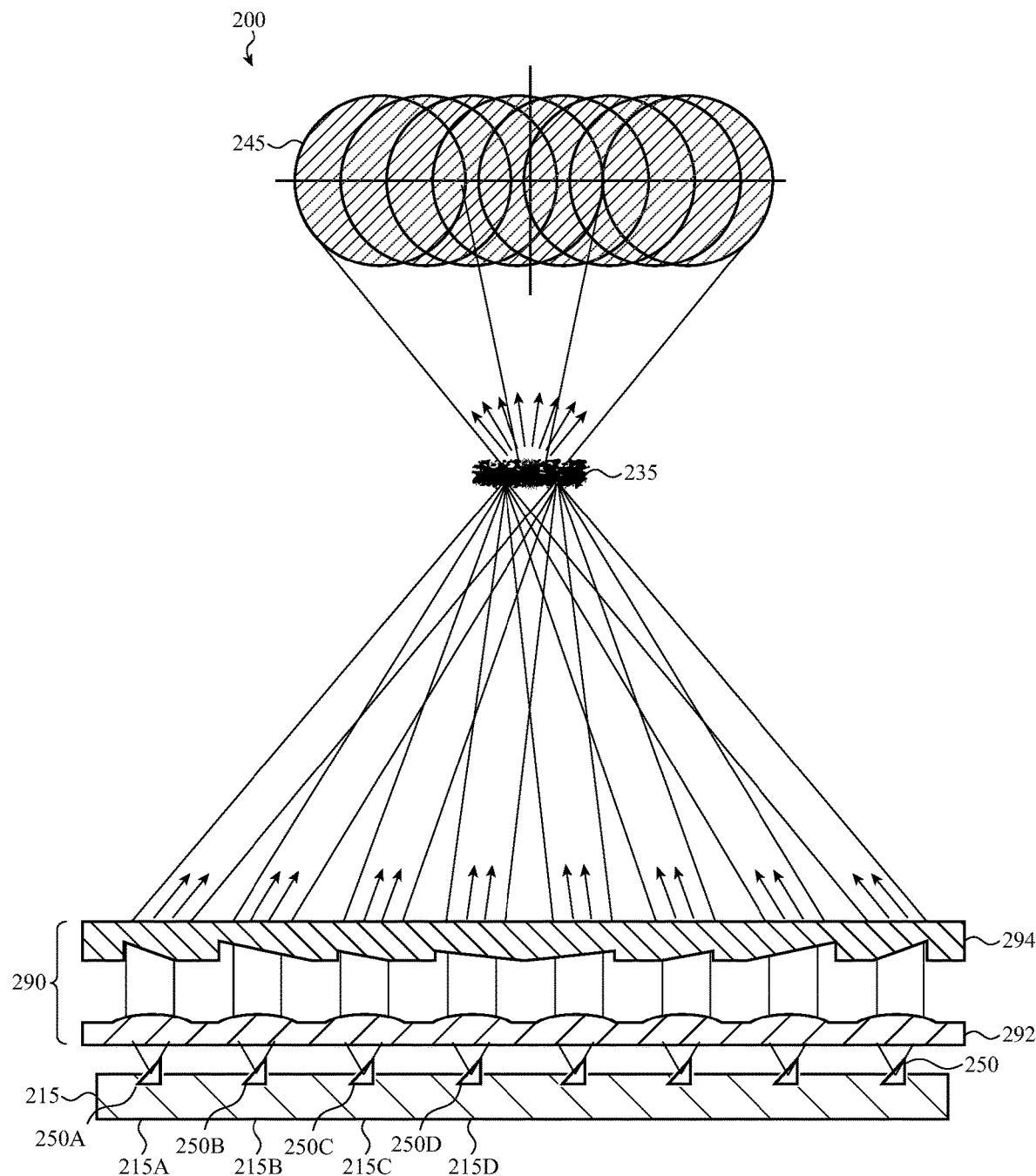
FIG. 2A illustrates an optical system.

FIG. 2A illustrates an optical system. The optical system 200 is a rotated view by approximately 90 degrees from the view of the photonics assembly of FIG. 1. The optical system 200 may include multiple photonics dies 215 and output couplers 250. The photonics die may include multiple photonics dies 215, in which each of the individual photonics dies may be referred to with a separate element number such as 215a, 215b, 215c, and so forth. Although eight photonics dies 215 are depicted in FIG. 2A, any appropriate number of photonics dies 215 may be included in the optical system 200. Similarly, each of the individual output couplers 250 may be referred to with separate element numbers, and so forth.

In some examples, each of the photonics dies 215 may include multiple lasers and each photonics die 215 may emit over a different wavelength range, where the lasers of the corresponding photonics die 215 may emit at unique wavelengths within the wavelength range of the photonics die 215. The photonics dies 215 may be integrated into a photonics system that may combine all of the emitted light over all of the wavelength ranges into a single waveguide via an optical multiplexer. In some examples, this light may be split into multiple output waveguides, where each waveguide may reach an output coupler 250. In some examples, when a single laser generates a single wavelength, the single wavelength of light from the single laser may be routed to all of the output couplers 250. Thus, once the single wavelength of light from the single laser reaches free space, there may be multiple simultaneous beams of light all of which came from the same single laser on the same photonics die. Once a different single laser on a different photonics die emits a different wavelength of light, the different wavelength of light may pass through all of the same output couplers and may pass through the same free space optical system. It may be understood that the number of photonics die 215 and the number of output couplers 250 may be different from each other (e.g., there may be either a greater number of photonics die 215 than output couplers 250 or a greater number of output couplers 250 than photonics die 215).

The optical system 200 may generate a predetermined illumination profile which may include controlling both the spatial profile of a light beam and providing a predetermined range of light angles at the diffusing element 235, which will be discussed in further detail with reference to FIGS. 2B-2D and 3-8. The range of beam angles incident on the diffusing element 235 may be a large range of beam angles so that the optical system 200 may reduce noise, and as such may be adjusted accordingly.

As illustrated in FIG. 2A, the optical system 200 may include the photonics die 215, which may provide light, via the output coupler 250, to the optical subsystem 290. In some examples, all of the light emitted by the photonics dies 215 may be coupled into a single waveguide. This single waveguide may provide light to each of the output couplers 250. In some examples, the light received from the output couplers 250 and by the optical subsystem 290 may be collimated, directed, and/or deflected light at various angles, by the optical subsystem 290 and to the measured sample volume (not illustrated in FIG. 2A). The optical subsystem may include one or more elements to achieve the desired functionality. In some examples, the optical subsystem may include a collimation lens array 292 and a deflection prism array 294. In some examples, the output coupler 250 may provide light to the collimation lens array 292 of the optical subsystem 290. The collimation lens array 292 may collimate the light and direct the light to the deflection prism array 294, also of the optical subsystem 290. The deflection prism array 294 may deflect the light at varying angles depending from which output coupler 250 the light was received. The deflected light from the deflection prism array 294 may be directed to the diffusing element 235 and then to the measured sample volume.

In some examples of FIG. 2A, the diffusing element 235 may be positioned in the approximate range of 500 microns to 3 millimeters from the measured sampling interface. The diffusing element 235 may be located close enough to the measured sample volume, so that the path length may be controlled. Additionally, the distance between the output coupler 250 and the diffusing element 235 may be approximately 2.5-5 millimeters. As the light leaves the photonics die 215, the light beam may continue to diverge as it passes through each element of the optical system 200. In some examples, the beam spread of the collective light beam in the widest dimension may be between 1-5 microns or less as the light exits the photonics die 215, then the beam spread of the collective light beam in the widest dimension may be approximately 100-300 microns when incident on the collimation lens array 292. The beam spread of the collective light beam may spread in the widest dimension to approximately 2.5 mm when incident on the diffuser and then spread in the widest dimension to approximately 3.0 mm or in the approximate range of 2 mm-4 mm when incident on the measured sample volume. Because the collective light beam spreads as it passes through the optical system 200, there is a corresponding range of angles that also changes. The angle range and beam size at the measured sample volume will be discussed in further detail with reference to FIGS. 2C and 2D.

In some examples, the photonics assembly may be used to measure a signal intensity from the measured sample volume of FIG. 1. It may be understood that every spatial position may receive every wavelength. When interrogating at one angle launch light and there is one signal on the detector, the coherent noise may be high for any single launch angle, however, multiple de-correlated measurements may be used to help identify the signal. One way to determine the signal intensity in the presence of coherent noise is by obtaining multiple de-correlated measurements that have the same nominal underlying signal with different de-correlated coherent noise views. In some examples, the de-correlated coherent noise views may be provided by de-cohered light. De-cohered light is light that does not interfere to provide coherent noise. Providing a target number of unique coherent noise views may be achieved by using phase shifters and a diffusing element together in the photonics assembly. For example, the phase shifters may provide light to the output couplers and result in de-cohered light. There are various ways to change the coherent noise pattern on the detector; for example, by changing the wavelength of the light source or by changing the polarization of the light. Another way to change the coherent noise pattern on the detector may depend on how you launch light onto the sample and this will be discussed in further detail below and with reference to FIGS. 2B-2D and 3-8.

In one example, two different angles of return light may have the same path length once the light is reflected by the measured sample volume and the two signals are measured at a detector (not shown in FIG. 2A). The two signals may have different coherent noise patterns, so even though all other factors may be held constant, the two signals will have different intensities since both of the signals are the relevant signal plus some amount of coherent noise. By interrogating various angles, each of which signal will include some coherent noise, once the signals of the different angles of light are averaged together, the coherent noise may approach a zero mean and the signals may converge to the correct signal or the measured signal without coherent noise. In some examples, there may be deviations in the path length signal (e.g., in a system that may be designed to pick up single-scatter events, many returned photons may encounter multiple scattering events) along different paths. In some examples, multiple signals with largely similar signal characteristics (e.g., similar path length and similar sample characteristics), but with sufficiently different angles to create different noise views, and the signals may be averaged and may work to reduce the noise impact.

In FIG. 2A, the optical system may include eight output couplers. It may be understood that eight output couplers are described for explanatory purposes only and any number of output couplers may be used. By using multiple output couplers 250, the optical system 200 is not as dependent on the diffusing element 235 to generate coherent noise views. For example, if the optical system only used one output coupler, then the diffusing element would have to be much larger to diffuse the light to the desired range of angles and it would be difficult to control the motion of the diffusing element and the repeatability of the diffusing element positions or set of positions. Although this type of diffusing element may be used in the optical system with a single photonics die, the movement of the diffusing element would be very sensitive to any change in position and even a small change would generate a new coherent noise view, thus making it difficult to revisit the same coherent noise view from the same position due to the sensitivity. Because the optical system 200 uses multiple output couplers 250, the number of positions to which the diffusing element 235 may travel may be reduced in comparison with a system having a single output coupler. In some embodiments the positions the diffusing element 235 may move to may be a short distance apart from one another and in turn, the diffusing element 235 has a shorter full-travel distance than other embodiments with a greater distance between positions. In some embodiments, achieving a larger number of coherent noise views with a greater number of output couplers 250 may result in reducing the positions visited by the diffusing element 235. In this example, the diffusing element 235 may be smaller since the diffusing element 235 may travel to fewer positions.

In some embodiments, the diffusing element 235 may move between positions faster than the wavelengths of light change. For example, the diffusing element 235 may move to or through two or more positions during the same length of time that an emitter outputs a single wavelength of light. Thus, insofar as the diffusing element 235 occupies multiple such positions while a particular wavelength of light is emitted, those positions may be said to be "nested" within the particular wavelength.

In other embodiments, the wavelengths of light may change faster than the diffusing element 235 positions change. That is, the diffusing element 235 may be positioned in a first position during the same length of time that the emitter outputs multiple wavelengths. Because the wavelengths may change while the diffusing element 235 may stay in the same position, the wavelengths may be said to be "nested" within the position of the diffusing element 235. In this embodiment, each diffuser position may be visited only once per overall measurement and the multiple wavelengths may be used once per diffuser position. Generally, in some embodiments, the diffuser positions may be nested within the wavelengths, and in other embodiments, the wavelengths may be nested within the diffuser positions.

In some examples, each of the output couplers 250 may be coupled with a phase shifter (not illustrated in FIG. 2A), which may be included in the photonics die 215 or may be external to the photonics die 215. Phase shifters may generate unique coherent noise views very quickly, for example, approximately every 100 picoseconds. Even though the phase shifters may be capable of generating unique coherent noise views at a sufficient rate for coherent noise mitigation for the optical system, the phase shifters may occupy too much space and require too much operating power that the combination of the diffusing element 235 with the phase shifters may better comply with the photonics assembly specifications due to space and power considerations.

In some examples, light emitted by the photonics die 215A may provide light to at least an output coupler 250*a* that reflects light to the optical subsystem 290. The optical subsystem 290 may include two optical components, a collimation lens array 292 and a deflection prism array 294. In some examples, the functionality of the collimation lens array 292 and the deflection prism array 294 may be combined into a single optical subsystem 290. In some examples, the collimation lens array 292 may collimate the light received from the output couplers 250 and direct the light to the deflection prism array 294. The deflection prism array 294 may direct the light at different angles to the diffusing element 235. Generally, prisms are used to redirect light by refraction or internal reflection. In some examples, the amount a light beam is bent depends on the apex angle of the prism and the refractive index of the prism material. The angle of incidence of the light may further be used to adjust the apex angle of the prism.

In FIG. 2A, the output coupler 250a provides light to the collimation lens array 292, which may collimate the light and direct the light to the deflection prism array 294. The deflection prism array 294 is then able to predictably deflect the collimated light at a predetermined angle and toward the diffusing element 235. The angle at which the light exits the deflection prism array 294 depends on the position of the output coupler 250 from which it is received. For example, light received from the output coupler 250a may be directed to the diffusing element 235 at a different angle than the light received from the output coupler 250d, where the light received from the output coupler 250a may be a steeper angle relative to the deflection prism array 294 than the light received from the output coupler 250d. The deflection prism array 294 may be designed such that each light beam will be directed to a predetermined position and angle incident on the diffusing element 235. Continuing the example, the deflection prism array 294 may direct light to the diffusing element 235. The diffusing element may provide an illumination profile 245 that is illustrated in far-field angle space and that is representative of the beam angles of light provided by the diffusing element 235. In some examples of the optical system 200, the illumination profile 245 may have a wide dimension and a narrow dimension. The illumination profile 245 of FIG. 2A illustrates the wide dimension. The illumination profile 245 will be discussed in further detail with respect to FIGS. 2B and 2C.

Generally, the diffusing element 235 may be capable of generating multiple coherent noise views by moving to multiple locations. However, the more the diffusing element 235 moves, the less reliable and repeatable each position becomes, thus similar to the phase shifter, even though the diffusing element 235 may sufficiently generate enough coherent noise views for the photonics assembly by changing positions, the combination of the diffusing element 235 and the phase shifter in the photonics assembly provides a more reliable means for mitigating coherent noise, while staying within the specifications of the photonics assembly such as system power, size, number of electrical connections available, and so forth. Further, due to the ability to control the beam spread and the range of angles of the light between the output couplers to the optical subsystem 290 and between the optical subsystem 290 and the diffusing element 235, the optical system 200 may reliably generate a predetermined illumination profile of light.

In some examples, the diffusing element 235 may receive light with an input angle and diffuse the light into a larger output spread of angles. In the example of FIG. 2A, because the diffusing element 235 receives eight light beams from the eight output couplers 250, the diffusing element 235 may output eight light beams with eight angle spreads. Additionally, the diffusing element 235 may move to multiple locations to mitigate coherent noise in the optical system 200.

The positioning of the diffusing element 235 and the amount by which the diffusing element 235 moves to generate a new coherent noise view is determined by the diffuser design; for example, the eight degree angle. In some examples, the diffuser noise may depend at least partially upon the repeatability of the diffusing element 235 positioning. In some examples, diffuser noise may be a position-to-position variation in total optical power throughput of the system as the diffusing element 235 moves. Diffuser noise may be semi-wavelength independent and sample independent insofar as detailed scattering characteristics may be affected, and may be primarily determined by the structure/design of the diffusing element 235, and secondarily affected by the remainder of the system.

In some examples, each wavelength or wavelength range of light emitted by a corresponding light source may pass through the diffusing element 235 at the same set of diffuser states or diffuser positions. That is, the diffusing element 235 may move to a first position for a first wavelength or wavelength range of light emitted by a first photonics die, then the diffusing element 235 may move to a second position for the first wavelength of light, then a third position, and so forth. The diffusing element 235 may then move to the same first position for a second wavelength or wavelength range of light emitted by a second photonics die, then move to the same second position, and then to the third position, and so forth. As a result, the photonics assembly may interrogate each wavelength or wavelength range emitted by each photonics die at each diffuser position. Should multiple wavelengths of light experience different diffusing element positions, then the diffuser noise may be intertwined with the wavelength change. It may then become difficult to verify which part of the signal may be attributed to diffuser noise as opposed to an actual signal change due to the wavelength change, thus it would be difficult to verify which part of the signal is the relevant signal for measurement of the sample.

In FIG. 2A, because there are eight output couplers 250 with a phase shifter and each of the output couplers provides light, this allows the diffusing element 235 to be eight times slower or move eight fewer times, thus resulting in less reliance on the diffusing element 235. Although eight photonics dies and eight output couplers are discussed with reference to FIG. 2A, this is for convenience and ease of description and any appropriate number of photonics dies and any appropriate number of output couplers may be used in the photonics assembly.

The diffusing element 235 receives light at a predetermined angle and diffuses the light and provides an output spread of angles. In the example of FIG. 2A, the diffusing element 235 receives eight input light beams, and in turn, provides eight angle output spreads to produce the illumination profile 245. In some examples, the diffusing element 235 may generate an approximately eight degree circle for each light beam received from the deflection prism array 294. By overlapping the light beams, the diffusing element 235 may produce an illumination profile 245 that appears to be a "stripe" of light. Generally, there are four primary dimensions which may be varied for path length control, an x dimension, a y dimension, an x angle dimension, and a y angle dimension. The dimension and path length control will be discussed in further detail below and with reference to FIG. 2C and FIG. 2D.

As illustrated in FIG. 2A, the light beams from the output couplers 250 may overlap one another to produce the illumination profile 245. Because there are eight output couplers, eight overlapping circles are illustrated in FIG. 2A.

The eight output couplers 250 are used for explanatory and descriptive purposes only and any appropriate number of output couplers 250 may be used in the optical system 200. The overlap of the light beams in the illumination profile 245 and the circular shape of the light beams from the diffusing element 235 are at least partially dependent on the diffusing element design. The overlap of angles is a result of the cone shape in angle space of the light beams, because coherent noise mitigation becomes more effective when covering most of the angle space of the illumination profile. In some examples, a different shaped light beam in angle space may exit the diffusing element 235 depending on the diffusing element design. In some examples, the diffusing element 235 may diffuse a rectangular light beam in angle space, which would result in little to no overlap of the diffused light to cover the specified angle spaces. In some examples, the diffusing element may be any appropriate shape such as rectangular, square, linear, circular, elliptical, and so forth. In some examples, a circular diffusing element may generate a circular far-field angle profile.

Figure 2B:
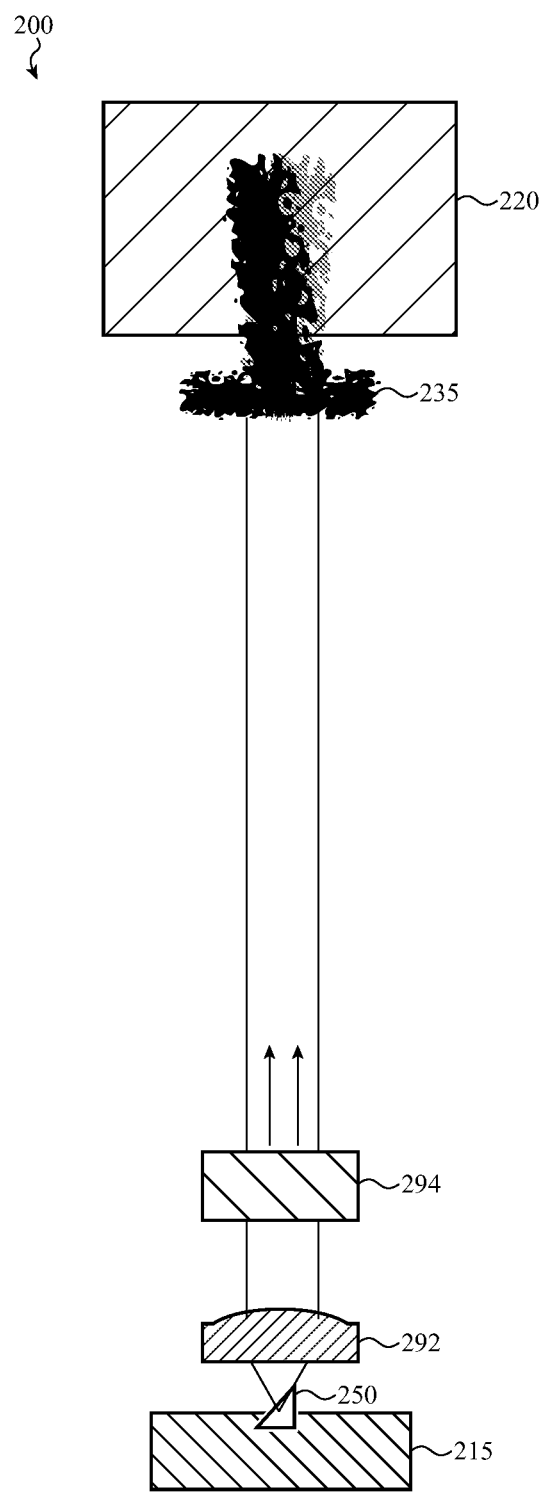
FIG. 2B illustrates an optical system.

FIG. 2B illustrates an optical system. FIG. 2B is the same view of the photonics assembly illustrated in FIG. 1, which may be referred to as the side view, and FIG. 2B illustrates the narrow dimension of the illumination profile, whereas FIG. 2A illustrates the wide dimension of the illumination profile. Because FIG. 2B is viewed from the side, and although only one photonics die 215 and one output coupler 250 are depicted, there are multiple photonics dies 215 and multiple output couplers 250 that cannot be viewed from the side view. The optical system 200 of FIG. 2B may include similarly numbered components as FIG. 2A and represent elements with similar features and functionality.

Similar to FIG. 2A, FIG. 2B includes photonics dies 215 that emit light via an output coupler 250, toward the collimation lens array 292. The collimation lens array 292 may collimate the light and the deflection prism array 294 may receive the collimated light and deflect it toward the diffusing element 235. The diffusing element 235 may then provide light to the measured sample volume. In some examples, the light incident on the measured sample volume may have the illumination profile as discussed with reference to FIG. 2A. Similar to FIG. 2A, the diffusing element 235 may generate an eight degree circle from each light beam received from the output coupler 250.

Generally, the optical system 200 of FIG. 2B provides de-phased light via the photonics dies 215. The light may be combined on the diffusing element 235 to generate the predetermined illumination profile, which may include the spatial profile of the light as well as the predetermined angle spread of the light. The narrow dimension of the illumination profile produced in FIG. 2B may provide for path length control of the emitted light through the measured sample volume. Should the illumination profile in the narrow dimension vary from the predetermined value, the optical system may not be able to control the path length as effectively. The narrow dimension and the wide dimension of the optical system 200 will be discussed in further detail with reference to FIGS. 2C and 2D.

Figure 2C:
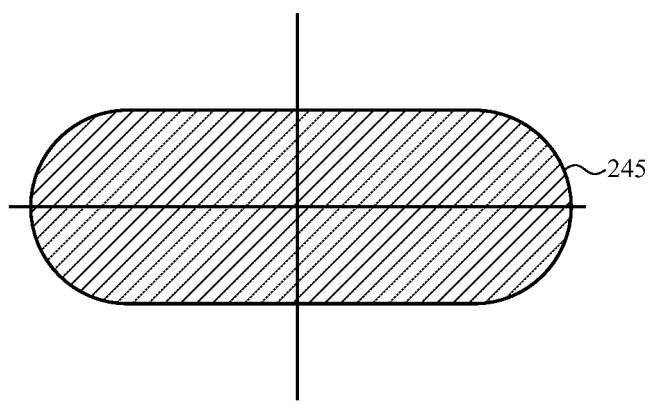
FIG. 2C is a representation of an illumination profile.

FIG. 2C is a representation of an illumination profile 245 in angle space generated by the diffusing element of the photonics assembly. FIG. 2C is an illumination profile for the light beam angle spread generated by the diffusing element of the optical system discussed with reference to FIGS. 2A and 2B. The optical system may generate the predetermined angle space or light beam spread of angles of the illumination profile 245 incident on a sample. Generating the illumination profile (e.g., both in the spatial profile and angle space) of the light for the predetermined angle space allows for effectively mitigating coherent noise before the light reaches the sample.

Generally, coherent noise mitigation becomes more effective when covering most of the angle space of the illumination profile. As previously described, the diffusing element may be an eight degree circular diffuser, such that the light beams may draw out at approximately eight degrees. In some examples, the diffusing element may provide an angle space in a range of 40-60 degrees by 4-15 degrees. The eight degree circular diffuser is discussed herein for explanatory purposes only as any appropriate diffuser with any appropriate angle range may be used in each of the embodiments discussed.

In some examples, the predetermined beam angles exiting from the diffusing element to be incident on the sample may be approximately fifty degrees in a first dimension and approximately eight degrees in a second dimension. Additionally, although fifty degrees by eight degrees is used for explanatory purposes, any angle space may be used. For example, the angle space may be in the range of 40-60 degrees by 4-15 degrees. The shape of the light beam in angle space is at least partially due to the overlapping angles of the light beams as discussed with reference to FIG. 2A. Additionally, the light beam angles may be larger in one dimension than the other due to the sensitivity of the profile. In one dimension of angle space, the variation may be less sensitive when controlling the optical path length due to geometrical considerations of the optical system and, in a second dimension of angle space, the variation may be more sensitive and may have a smaller angle spread.

Figure 2D:
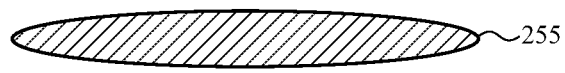
FIG. 2D is a representation of an illumination profile.

FIG. 2D is a representation of an illumination profile 255 of the light beam shape and size. The beam size incident on the sample may be approximately 3 mm in a first direction and approximately 0.2 mm in a second direction. Generally, the larger the illumination profile of light that is incident on the measured sample volume, the more signals may be detected from the measured sample volume, thus it may be desirable to have a large illumination profile of light that is incident on the measured sample volume. Similar to the spread of beam angles in angle space, the beam size may be less sensitive to variation in a first direction than the other second direction for optical path length control.

Figure 3A:
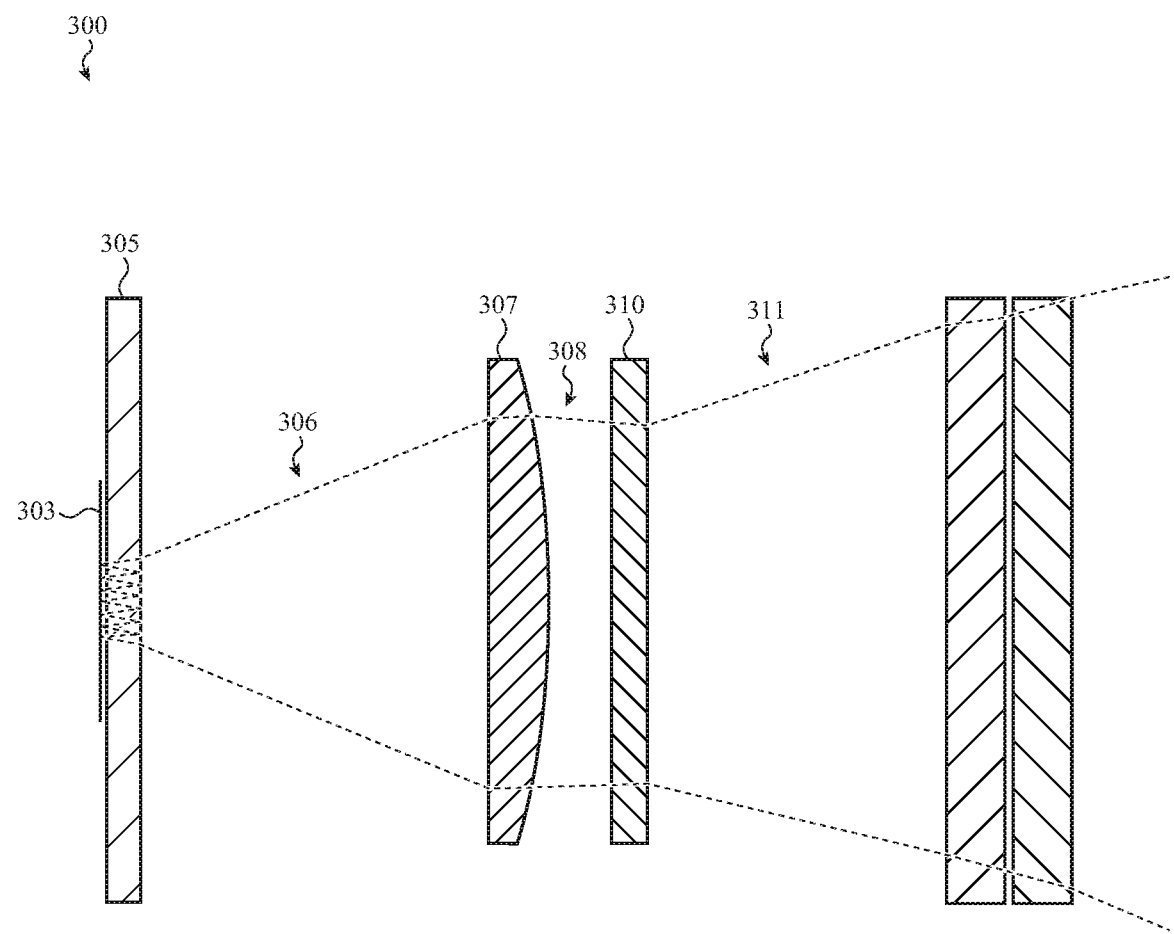
FIG. 3A illustrates an example optical subsystem in an optical system.

FIG. 3A illustrates an example optical subsystem in an optical system. The optical system 300 of FIG. 3A includes light system 303, a first lens 305, a second lens 307, and a diffusing element 310. The optical system 300 illustrates a wide angle range of light provided by the diffusing element when compared to the angle at which light exits the light system 303. Light system 303 may include one or more photonics dies and one or more output couplers. The light system 303 may provide light to a first lens 305, which may propagate light along a light path 306 to a second lens 307. In some examples, the first lens 305 and the second lens 307 may be cylinder lenses to generally collimate the light into overlapping beams. It may be understood that the light paths 306, 308 and 311 illustrate only the outer light beams that define the outer bounds of an area in which all the light beams may propagate. For example, light path 306 may illustrate only two outer light beams, but there may be multiple overlapping light beams between the two outer light beams. The outer light beams of light paths 306, 308, and 311 illustrate the general shape and direction of the light paths. The second lens 307 may provide light along light path 308 to the diffusing element 310. Once the light passes through the diffuser, the diffusing element angle range is significantly larger than the smaller separation of the angles provided by the light system 303.

Figure 3B:
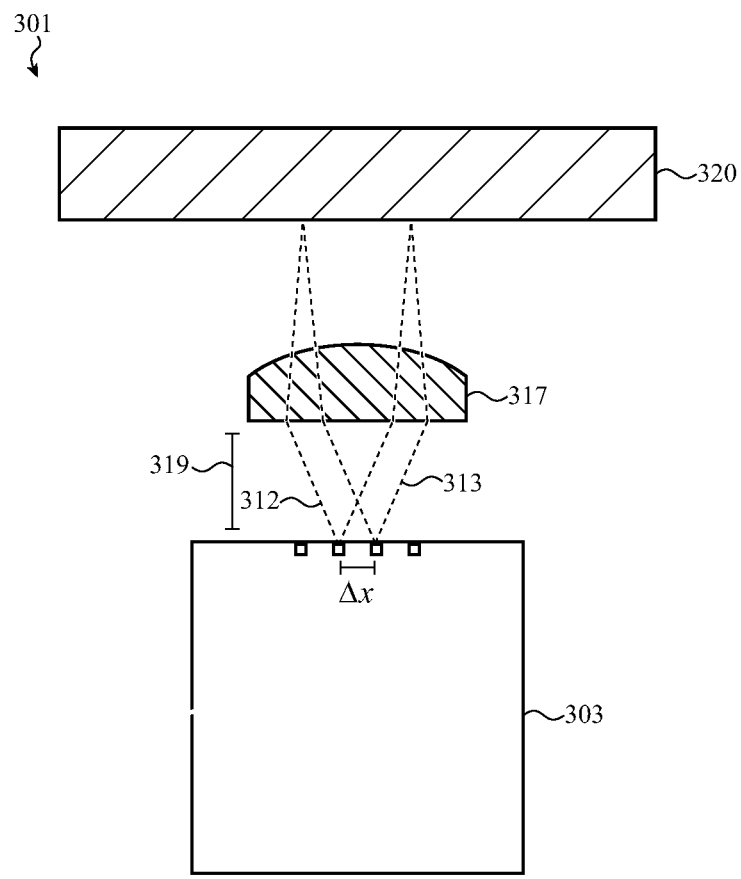
FIGS. 3B-3C illustrate an example optical system with no diffuser and the corresponding far field angular separation of light.
Figure 3C:
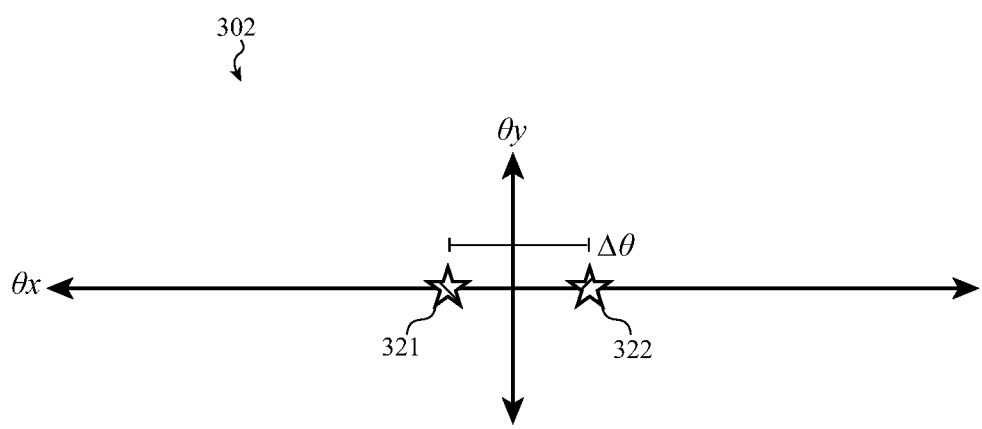

FIGS. 3B-3C illustrate an example optical system with no diffusing element and the corresponding far field angular separation of light. In FIG. 3B, the optical system 301 includes a light system 303 that provides light along light paths 312 and 313 to a lens 317. The light may pass through the lens 317 to the sample volume 320. In some examples, the lens 317 may be a slow axis collimator. In FIG. 3B, the light sources of the light system 303 may be separated by a Δx. The light from the light sources may propagate along light paths 312 and 313, each of which have a beam spread. The light may pass to the lens 317, which may collimate the light and the light may then pass to the sample volume 320. In FIG. 3B, the light system 303 may be separated from the lens 317 by a distance 319.

In FIG. 3C, the diagram 302 includes the points 321 and 322, which illustrate the angular separation of the light beams along Θx, from the light sources separated by Δx. In some examples, the angular separation between the light sources, which is ΔΘ may be the arctangent of the quantity Δx divided by the distance 319.

Figure 3D:
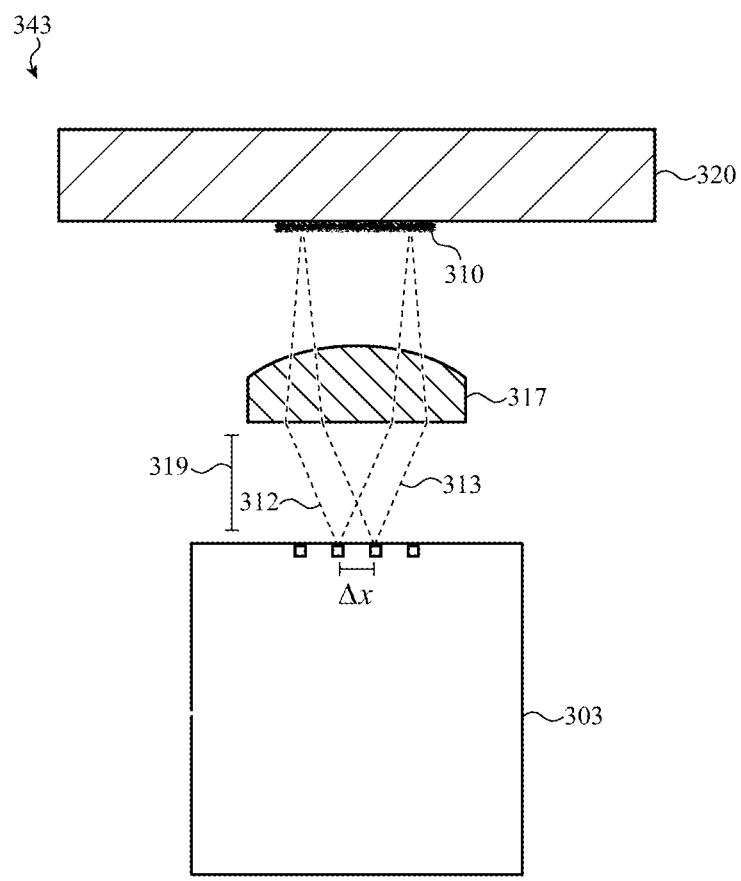
FIGS. 3D-3E illustrate an example optical system with a diffuser and the corresponding non-overlapping far field angular separation of light.
Figure 3E:
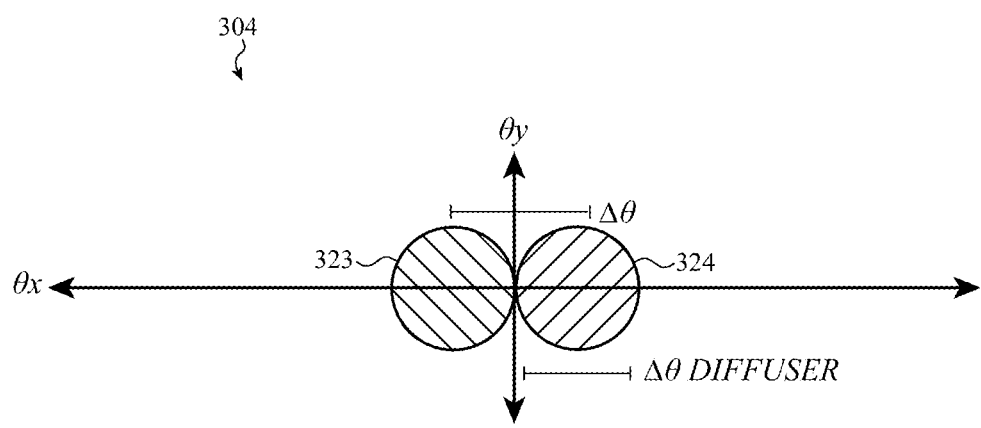

FIGS. 3D-3E illustrate an example optical system with a diffuser and the corresponding non-overlapping far field angular separation of centroids. The optical system 343 is similar to the optical system 301 of FIG. 3B with the addition of the diffusing element 320. That is, the optical system 343 may include a light system 303 that provides light along light paths 312 and 313 to the lens 317. The lens 317 passes the light to the diffusing element 320 before the light passes to the sample 320. In FIG. 3D, the light sources of the light system 303 may also be separated by Δx and the light system 303 may be a distance 319 from the lens 317. Although the light depicted in FIG. 3D appears to be similar to the light in FIG. 3B, the diagram 304 of FIG. 3E illustrates the non-overlapping far field angles after the diffusing element 320.

In FIG. 3E, the diagram 304 includes the beam spread centroids 323 and 324, which illustrate the angular separation of the light beams along Θx, from the light sources separated by Δx. In some examples, the angular separation between the light sources, which is ΔΘ may be the arctangent of the quantity Δx divided by the distance 319. In FIG. 3E, ΔΘ diffuser is greater than ΔΘ and the beam spread also covers a larger area than that resulting from not using a diffusing element. In FIG. 3E, the light beams may be uncorrelated so long as the far field centroids are not overlapping with one another.

Figure 3F:
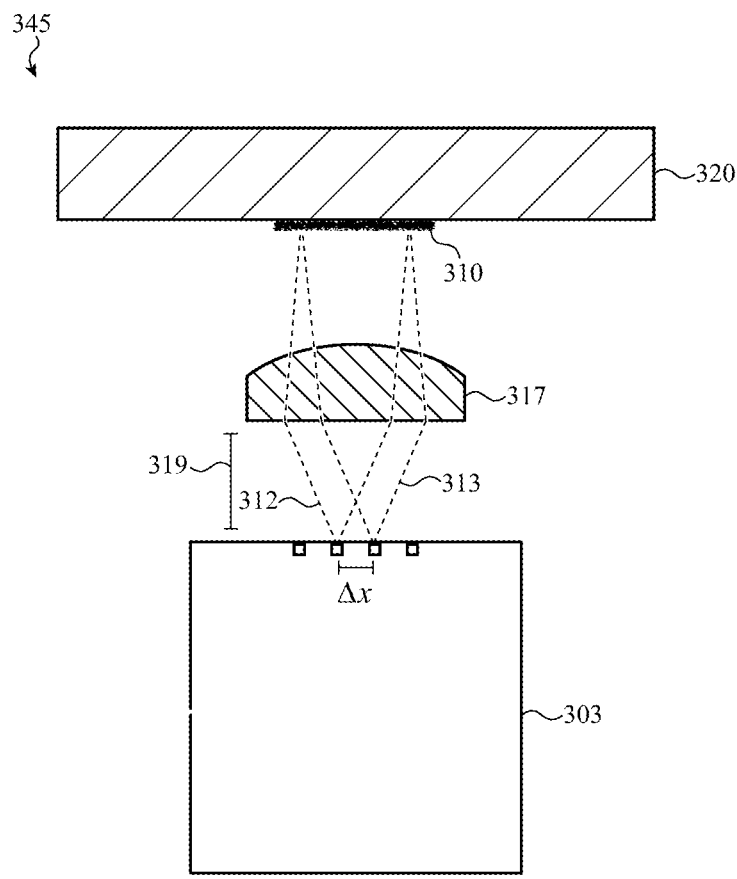
FIGS. 3F-3G illustrate an example optical system with a diffuser and the corresponding overlapping far field angular separation of light.
Figure 3G:
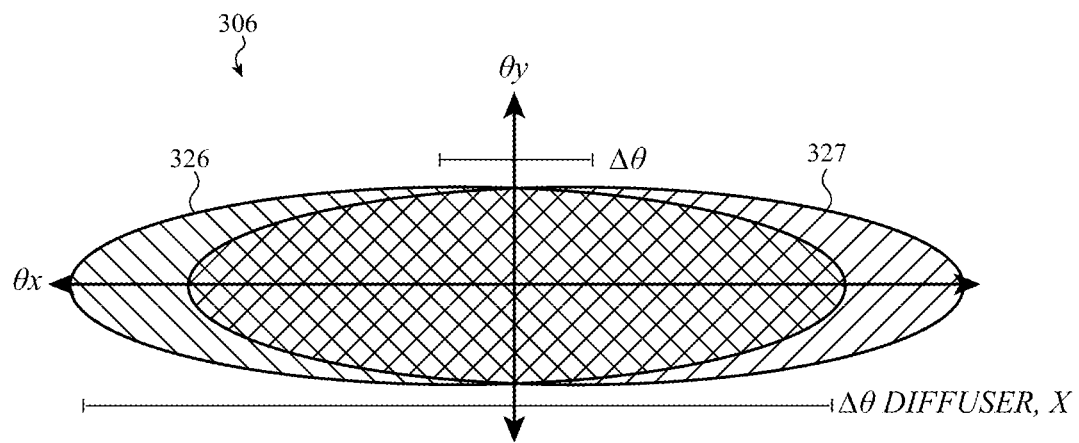

FIGS. 3F-3G illustrate an example optical system with a diffuser and the corresponding overlapping far field angular separation of centroids. The optical system 345 is similar to the optical system 343 of FIG. 3D and also includes the diffusing element 320. That is, the optical system 345 may include a light system 303 that provides light along light paths 312 and 313 to the lens 317. The lens 317 passes the light to the diffusing element 320 before the light passes to the sample 320. In FIG. 3F, the light sources of the light system 303 may also be separated by Δx and the light system 303 may be a distance 319 from the lens 317. Although the light depicted in FIG. 3F appears to be similar to the light in FIG. 3D, the diagram 306 of FIG. 3G illustrates the overlapping far field angles after the diffusing element 320 as opposed to the non-overlapping far field angles after the diffusing element 320.

In FIG. 3G, the diagram 306 includes the beam spread centroids 326 and 327, which illustrate the angular separation of the light beams along Θx, from the light sources separated by Δx. In some examples, the angular separation between the light sources, which is ΔΘ, may be the arctangent of the quantity Δx divided by the distance 319. In FIG. 3G, ΔΘ diffuser along Θx is greater than ΔΘ and the beam spread also covers a larger area than that resulting from not using a diffusing element. In FIG. 3G, the overlapping far field pattern may be dominated by the light passing through the diffusing element 320.

Figure 4:
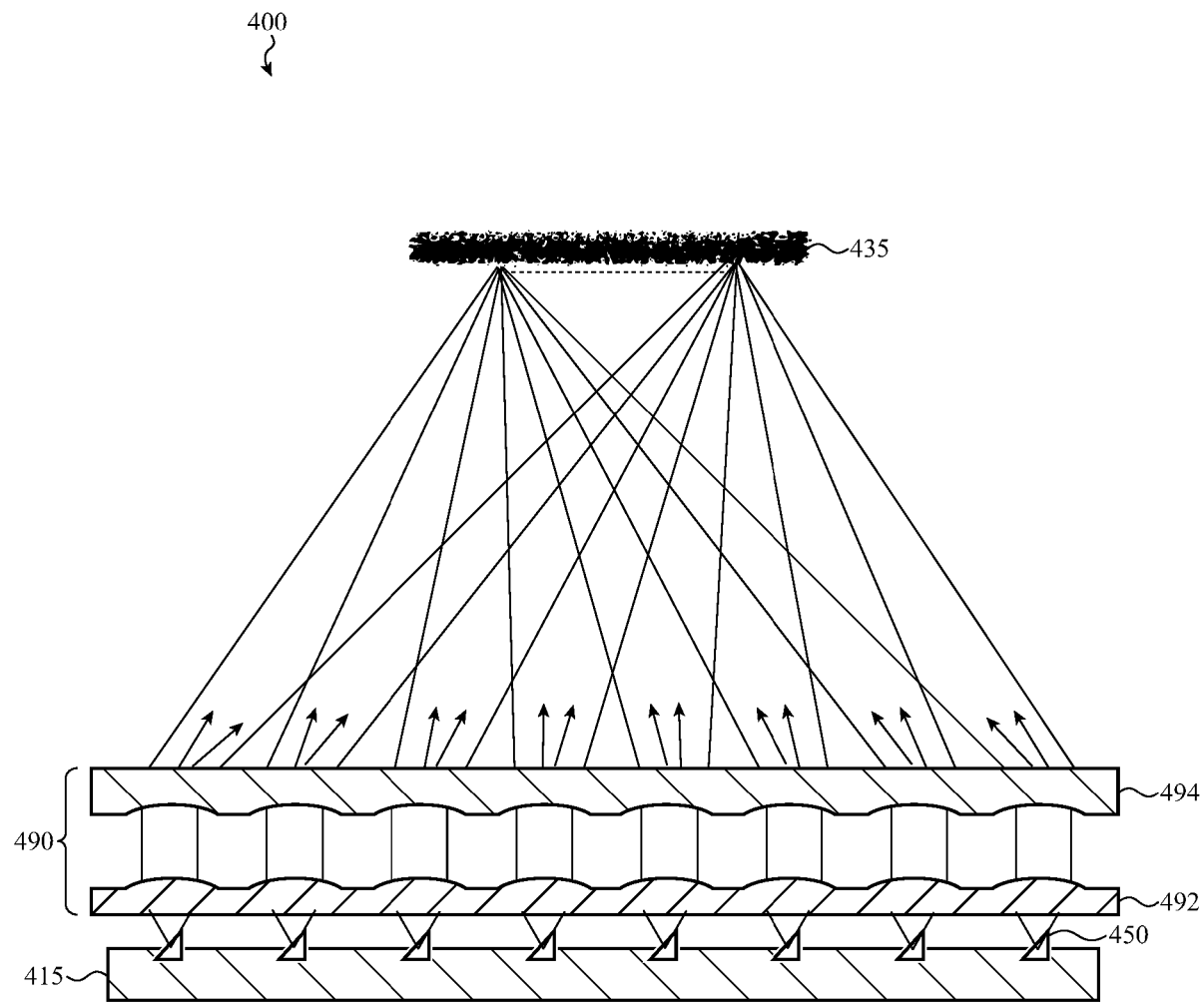
FIG. 4 illustrates an example optical subsystem in an optical system.

FIG. 4 illustrates an example optical subsystem in an optical system. In FIG. 4, the optical system 400 is a view of the photonics assembly illustrating the wide dimension. FIGS. 4-8 will illustrate a similar view of the photonics assembly illustrating the wide dimension and will include components similarly positioned to one another within the optical systems. The optical system 400 may generate a wide launch beam in the wide dimension or in the "stripe" width of the beam shape. Similar to FIGS. 2A and 2B, the optical system 400 of FIG. 4 includes photonics dies 415, output couplers 450, an optical subsystem 490, and a diffusing element 435.

In some examples, the optical subsystem 490 is a collimation lens array 492 and a diverger array 494. The collimation lens array 492 may collimate the light to provide control of the light beam direction for the diverger array 494. The diverger array 494 may also be a deflection array 494, where the light may be deflected at the appropriate angles to the diffusing element 435, and thus may be referred to as the deflection and diverger array herein. Although specific examples of components in optical subsystems are described, any appropriate optical component may be used in the photonics assembly to achieve the predetermined illumination profile to the diffusing element 435 and incident on the measured sample volume.

Figure 5:
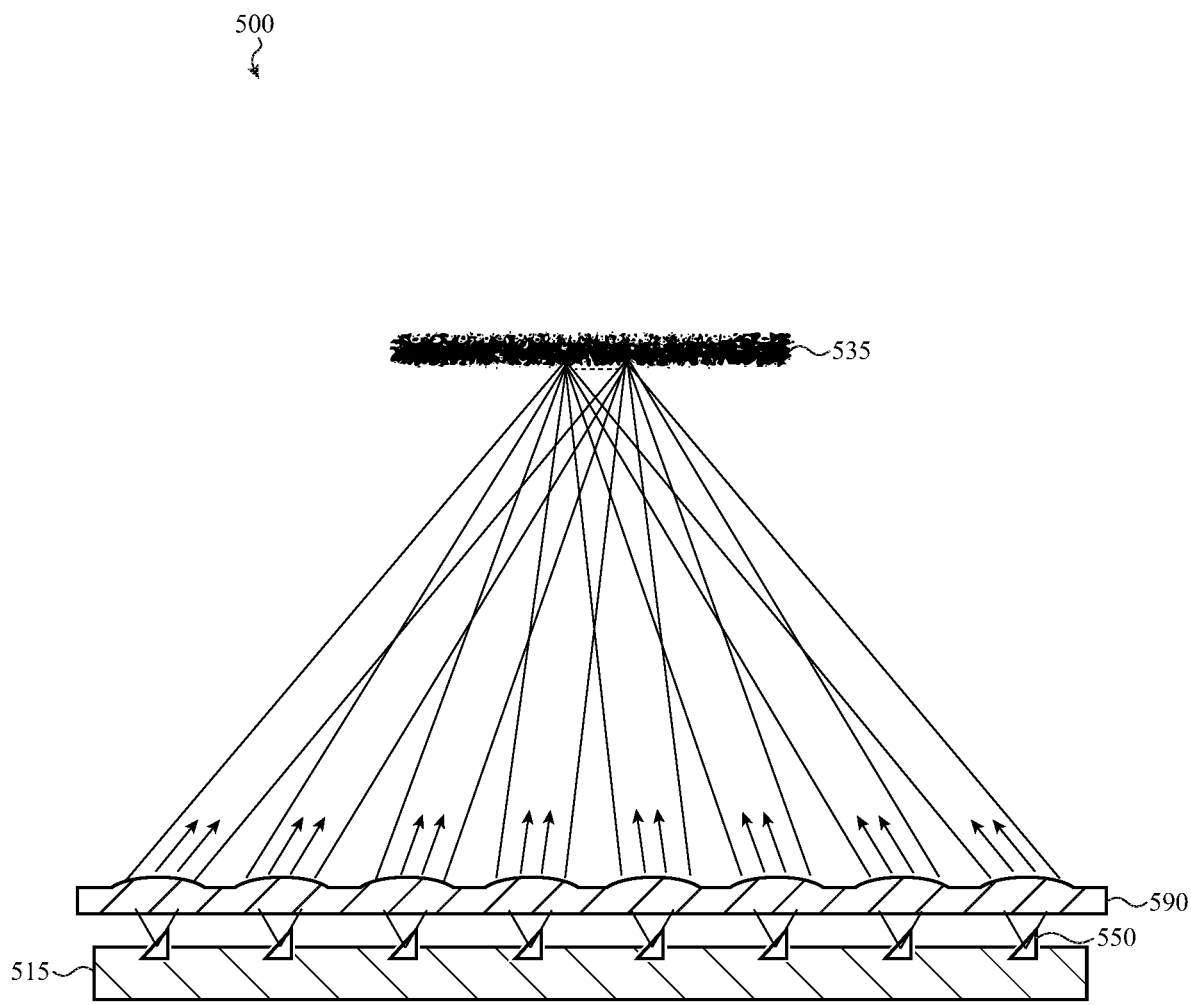
FIG. 5 illustrates an example optical subsystem in an optical system.

FIG. 5 illustrates an example optical subsystem in an optical system. In FIG. 5, the optical system 500 is a view of a partial photonics assembly illustrating the wide dimension. Similar to FIGS. 2A and 2B, the optical system 500 of FIG. 5 includes photonics dies 515, output couplers 550, an optical subsystem 590 and a diffusing element 535. The optical subsystem 590 is a decentered lens array. The decentered lens array 590 may be a single optical element that combines the functionality of the optical components of the optical subsystem of FIG. 2A. The decentered lens array 590 may approximately combine the functionality of a collimation lens array and the deflection prism array. The decentered lens array 590 includes a group of lenses that are decentered from a common axis respective to each lens in the array and which may steer the light toward the diffusing element 535.

Figure 6:
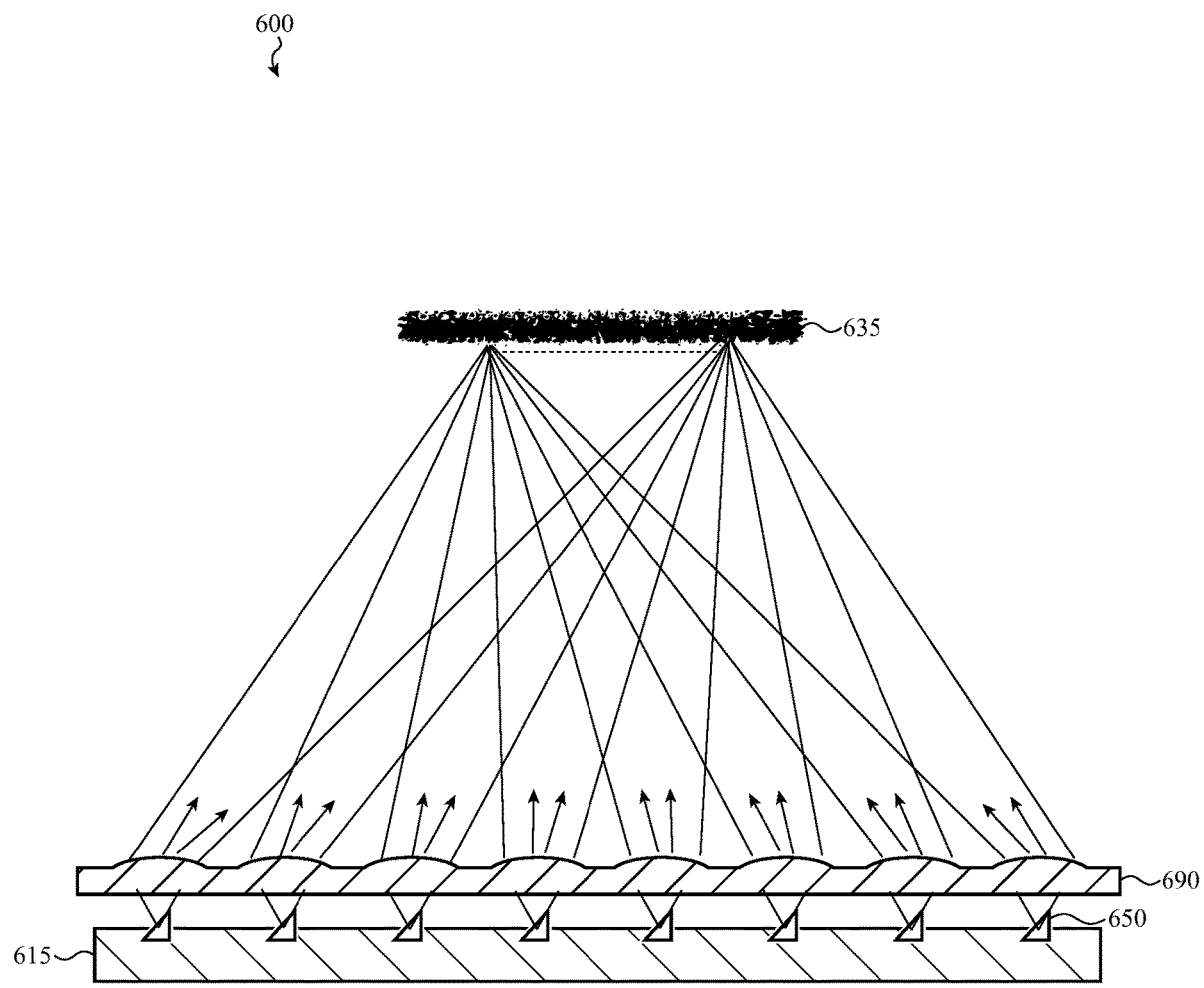
FIG. 6 illustrates an example optical subsystem in an optical system.

FIG. 6 illustrates another example of an optical subsystem in an optical system. Similar to the optical system 500 in FIG. 5, the optical system 600 in FIG. 6 is a view of a partial photonics assembly illustrating the wide dimension. The optical system 600 of FIG. 6 includes photonics dies 615, output couplers 650, an optical subsystem 690 and a diffusing element 635.

In the example of FIG. 6, the optical subsystem 690 is a decentered toroidal lens array. The decentered toroidal lens array 690 may be a single optical element that combines the functionality of the optical components of the optical subsystem of FIG. 5. The decentered toroidal lens array 690 may approximately combine the functionality of a collimation lens array and a deflection and diverger array. The decentered toroidal lens array 690 may collimate light in the narrow dimension of the illumination profile of light and may at least partially collimate light in the wide dimension using two different focal lengths, and may also steer the light beam in the wide dimension toward the diffusing element 635.

Figure 7:
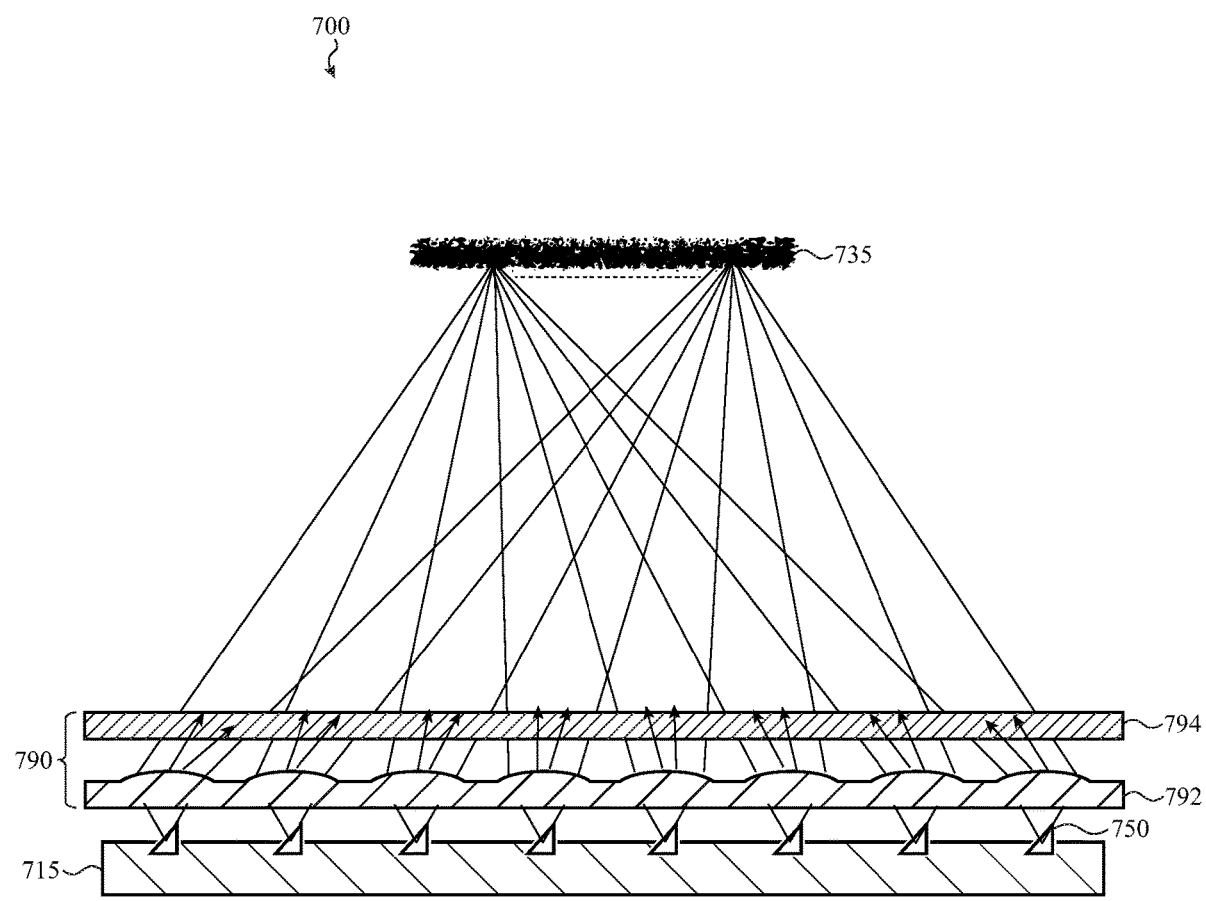
FIG. 7 illustrates an example optical subsystem in an optical system.

FIG. 7 illustrates another example of an optical subsystem in an optical system. In the example of FIG. 7, the optical subsystem 790 includes photonics dies 715, output couplers 750, a cylinder lens array 792 and a crossed cylinder lens array 794. The cylinder lens array 792 and the crossed cylinder lens array 794 may combine the functionality of a collimating array and a deflection array. The cylinder lens array 792 may collimate light in a first direction and does not collimate light in a second direction. For example, the cylinder lens array 792 may receive light from the photonics die 715 and the light may have a fast axis and a slow axis. The fast axis may have light that diverges faster than the slow axis. In some examples, when collimating the light using the cylinder lens array 792, the cylinder lens array 792 may have a short focal length in the fast axis direction. Additionally, the crossed cylinder lens array 794 may collimate the light in the second direction and not in the first direction and the crossed cylinder lens array 794 may have a longer focal length in the slow axis direction. The crossed cylinder lens array 794 may provide light to the sample 735.

Figure 8:
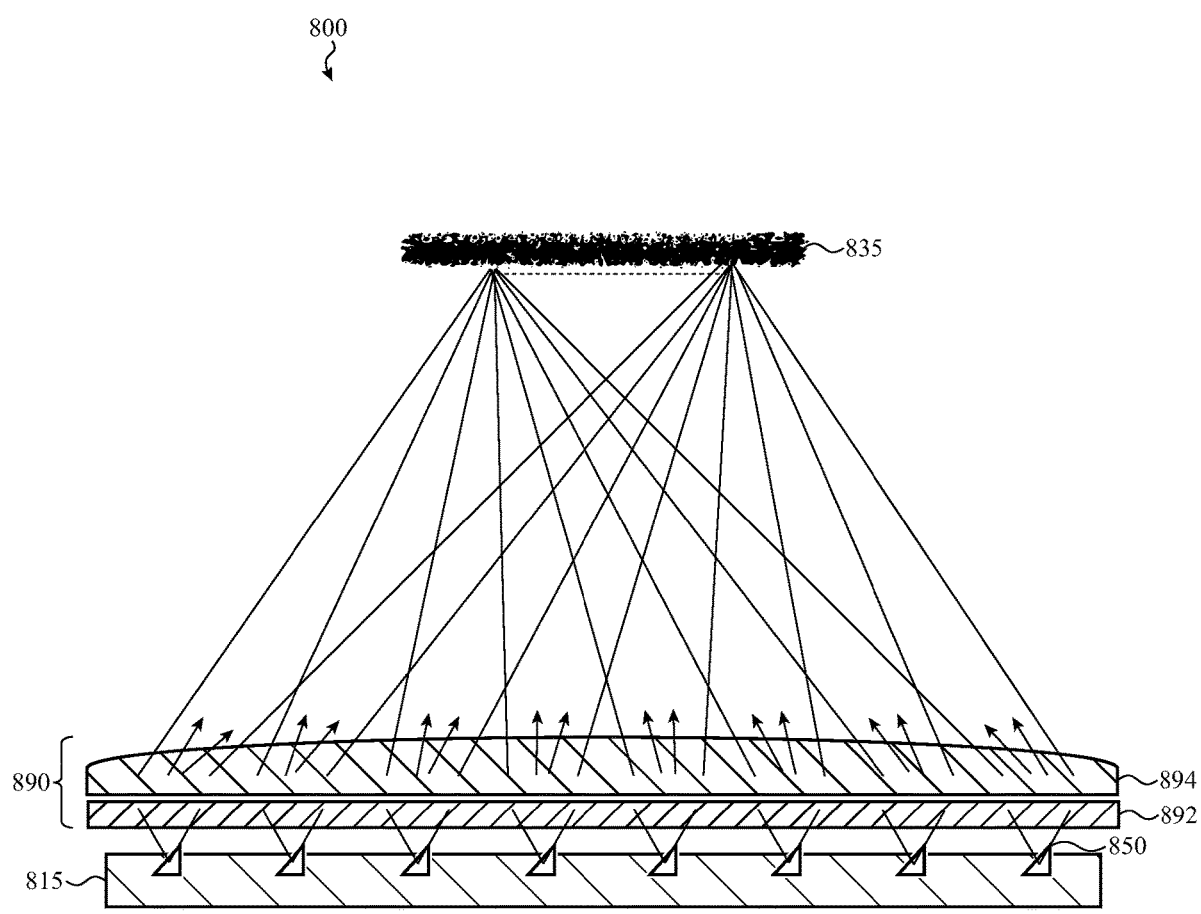
FIG. 8 illustrates an example optical subsystem in an optical system.

FIG. 8 illustrates another example of an optical subsystem in an optical system 800. In the example of FIG. 8, the optical subsystem 890 includes a fast axis collimator array 892 (e.g., which may be a cylinder array) and a slow axis focus and steering array 894. The fast axis collimator array 892 and the slow axis focus and steering array 894 may combine the functionality of the cylinder lens array and the crossed cylinder lens array of FIG. 7, along with singlet lenses. The fast axis collimator array 892 may receive light from the photonics dies 815 that have a fast axis and a slow axis. The fast axis collimator array 892 may collimate the light along the fast axis and not the slow axis. The slow axis focus and steering array 894 may focus the light along the slow axis and steer the light toward the diffusing element 835. Although specific optical elements have been discussed herein, there may be various ways to achieve the appropriate illumination profile incident on the diffuser and incident on the measured sample volume. In some examples, additional optical elements may be used between the photonics die and the measured sample volume. In some examples, the photonics assembly may not include a diffusing element. In some examples, the light beam may be folded in the photonics assembly. In some examples, the light beams may be separated and then allowed for the beam to spread in angles and in spatial profile and then combine the beams together. So long as the illumination profile with the predetermined beam angle and spatial profile are incident on the diffuser and are incident on the measured sample volume, other components of the photonics assembly may be varied including, but not limited to, the optical components of the photonics assembly, the positioning of the optical components relative to one another, the number of light sources, the type of diffusing element, any combination thereof, and so forth.

Figure 9:
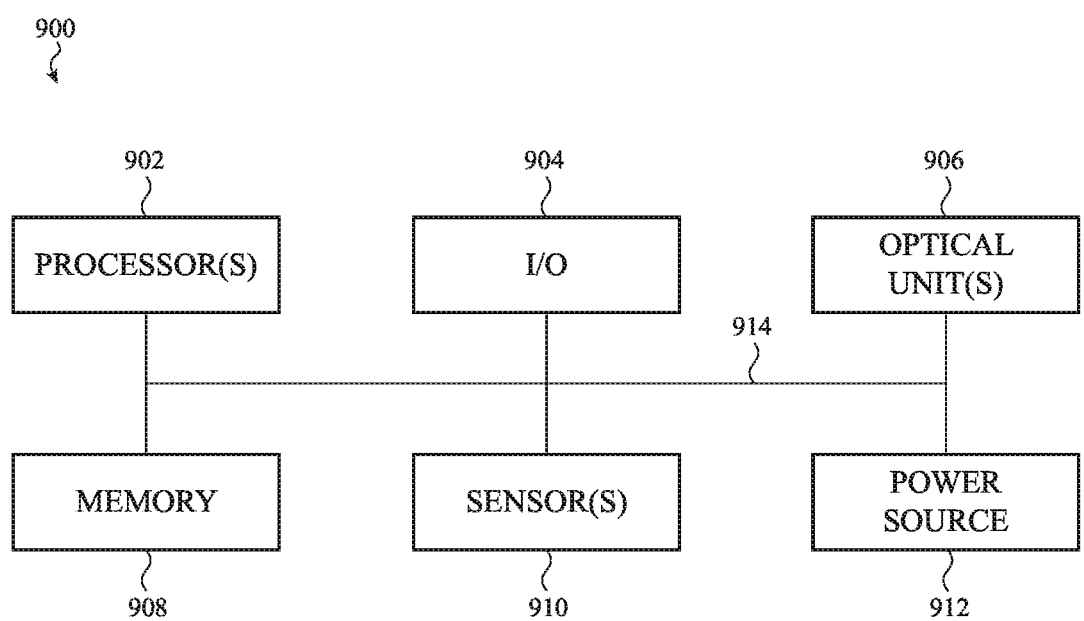
FIG. 9 illustrates an example block diagram of an optical system.

FIG. 9 illustrates an example block diagram of an optical device 900, which may in some cases take the form of any of the optical devices as described with reference to FIGS. 1-8. The optical device can include a processor 902, an input/output (I/O) mechanism 904 (e.g., an input/output device, such as a touch screen, crown or button, input/output port, or haptic interface), one or more optical units 906 (e.g., a photonics die which may include a laser diode), memory 908, sensors 910 (e.g., an optical sensing system), and a power source 912 (e.g., a rechargeable battery). The processor 902 can control some or all of the operations of the optical device 900. The processor 902 can communicate, either directly or indirectly, with some or all of the components of the optical device 900. For example, a system bus or other communication mechanism 914 can provide communication between the processor 902, the I/O mechanism 904, the optical unit 906, the memory 908, the sensors 910, and the power source 912.

The processor 902 can be implemented as any electronic device capable of processing, receiving, or transmitting data or instructions. For example, the processor 902 can be a microprocessor, a central processing unit (CPU), an application-specific integrated circuit (ASIC), a digital signal processor (DSP), or combinations of such devices. As described herein, the term "processor" is meant to encompass a single processor or processing unit, multiple processors, multiple processing units, or other suitable computing element or elements.

It should be noted that the components of the optical device 900 can be controlled by multiple processors. For example, select components of the optical device 900 (e.g., a sensor 910) may be controlled by a first processor and other components of the optical device 900 (e.g., the optical unit 906) may be controlled by a second processor, where the first and second processors may or may not be in communication with each other.

The I/O mechanism 904 can transmit and/or receive data from a user or another electronic device. An I/O device can include a display, a touch sensing input surface, one or more buttons (e.g., a graphical user interface "home" button), one or more cameras, one or more microphones or speakers, one or more ports, such as a microphone port, and/or a keyboard. Additionally or alternatively, an I/O device or port can transmit electronic signals via a communications network, such as a wireless and/or wired network connection. Examples of wireless and wired network connections include, but are not limited to, cellular, Wi-Fi, Bluetooth, IR, and Ethernet connections.

The memory 908 can store electronic data that can be used by the electronic device 900. For example, the memory 908 can store electrical data or content such as, for example, audio and video files, documents and applications, device settings and user preferences, timing signals, control signals, and data structures or databases. The memory 908 can be configured as any type of memory. By way of example only, the memory 908 can be implemented as random access memory, read-only memory, Flash memory, removable memory, other types of storage elements, or combinations of such devices.

The optical device 900 may also include one or more sensors 910 positioned almost anywhere on the optical device 900. The sensor(s) 910 can be configured to sense one or more type of parameters, such as, but not limited to, pressure, light, touch, heat, movement, relative motion, biometric data (e.g., biological parameters), and so on. For example, the sensor(s) 910 may include a heat sensor, a position sensor, a light or optical sensor, an accelerometer, a pressure transducer, a gyroscope, a magnetometer, a health monitoring sensor, and so on. Additionally, the one or more sensors 910 can utilize any suitable sensing technology, including, but not limited to, capacitive, ultrasonic, resistive, optical, ultrasound, piezoelectric, and thermal sensing technology.

The power source 912 can be implemented with any device capable of providing energy to the optical device 900. For example, the power source 912 may be one or more batteries or rechargeable batteries. Additionally or alternatively, the power source 912 can be a power connector or power cord that connects the optical device 900 to another power source, such as a wall outlet.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings.

Although the disclosed examples have been fully described with reference to the accompanying drawings, it is to be noted that various changes and modifications will become apparent to those skilled in the art. Such changes and modifications are to be understood as being included within the scope of the disclosed examples as defined by the appended claims.

What is claimed is:

1. A photonics assembly, comprising:
   a set of semiconductor light sources, each of the set emitting light;
   a set of output couplers for receiving light from the set of semiconductor light sources;
   an optical subsystem positioned to receive the light from the set of output couplers and shape the light the optical subsystem comprising:
   a cylinder lens array positioned to receive the light from the set of output couplers, and
   a crossed cylinder lens array positioned to receive the light from the cylinder lens array; and
   a diffuser configured to provide the light with a coherent noise state of a set of coherent noise states on a sample, wherein:
   the diffuser is operative to repeatedly move between at least a first position and a second position; and
   by moving repeatedly between at least the first position and the second position, the diffuser mitigates coherent noise.

2. The photonics assembly of claim 1, wherein:
   a set of phase shifters is positioned to transmit light to each output coupler of the set of output couplers and generates de-cohered light;
   a beam spread of the light emitted by the set of semiconductor light sources upon exiting the set of semiconductor light sources is between 1 and 5 microns, and
   a beam spread exiting the diffuser is in a range of 2-4 mm upon incidence on the sample.

3. The photonics assembly of claim 1, wherein the diffuser is configured to provide diffused light in an eight degree by eight degree light beam to the sample.

4. An optical system, comprising:
   a set of semiconductor light sources for emitting light with multiple light beams;
   a set of output couplers for receiving the light from the set of semiconductor light sources; and
   a moveable diffusing element configured to:
   receive the light from the set of optical couplers;
   move to a set of positions for each output coupler of the set of output couplers to provide a set of different coherent noise states corresponding to each output coupler of the set of output couplers, and
   define an illumination profile incident on a sample.

5. The optical system of claim 4, further comprising:
   an optical subsystem configured to receive the light from the set of output couplers; and
   a set of phase shifters for de-cohering the light, wherein each light beam of the multiple light beams received by the set of output couplers is de-cohered by a corresponding phase shifter of the set of phase shifters, and each of the set of positions is repeatable.

6. The optical system of claim 4, further comprising:
   a frequency modulator for de-cohering the light provided by the set of output couplers.

7. The optical system of claim 4, wherein the moveable diffusing element is a circular diffuser.

8. The optical system of claim 4, further comprising:
   an optical subsystem configured to receive the light from the set of output couplers, wherein the illumination profile is based at least partially on an angle spacing of light received from the optical subsystem.

9. The optical system of claim 4, wherein the illumination profile is based at least partially on a total range of angles of light incident on the diffusing element.

10. The optical system of claim 4, wherein the light emitted by each light source of the set of semiconductor light sources is a different wavelength.

11. A method for mitigating coherent noise, comprising:
    emitting de-cohered light from a set of light sources;
    receiving the de-cohered light at an optical subsystem that generates a desired illumination profile; and
    diffusing the desired illumination profile of the de-cohered light using a moveable diffuser with coherent noise-unique diffuser states for each light beam received from each light source of the set of light sources.

12. The method of claim 11, wherein:
    the illumination profile is based at least partially on the angle spacing of light received from the optical subsystem;
    the coherent noise-unique diffuser states are repeatable for each light beam; and
    the total range of angles of light incident on the diffuser.

13. The method of claim 11, wherein emitting the de-cohered light comprises generating a beam spread that is less than 4 microns upon exiting the set of light sources.

14. The method of claim 13, wherein diffusing the de-cohered light comprises generating a beam spread of less than 3.2 mm when incident on a sample.

15. The method of claim 11, wherein emitting the de-cohered light comprises phase shifting the de-cohered light.

16. The method of claim 11, wherein:
    each light source of the set of light sources emits a different wavelength from each other, and
    diffusing the de-cohered light comprises generating a set of coherent noise views, wherein a same coherent noise view is generated for each wavelength.

* * * * *